(12) United States Patent
Takeda et al.

(10) Patent No.: US 11,696,287 B2
(45) Date of Patent: Jul. 4, 2023

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/608,106

(22) PCT Filed: Apr. 27, 2017

(86) PCT No.: PCT/JP2017/016854
§ 371 (c)(1),
(2) Date: Oct. 24, 2019

(87) PCT Pub. No.: WO2018/198295
PCT Pub. Date: Nov. 1, 2018

(65) Prior Publication Data
US 2020/0100241 A1    Mar. 26, 2020

(51) Int. Cl.
*H04W 72/04* (2023.01)
*H04W 72/21* (2023.01)
*H04L 5/00* (2006.01)
*H04W 72/044* (2023.01)
*H04W 72/23* (2023.01)

(52) U.S. Cl.
CPC ......... *H04W 72/21* (2023.01); *H04L 5/0042* (2013.01); *H04L 5/0053* (2013.01); *H04W 72/044* (2013.01); *H04W 72/23* (2023.01)

(58) Field of Classification Search
None
See application file for complete search history.

(56) References Cited

U.S. PATENT DOCUMENTS

| | | | | |
|---|---|---|---|---|
| 10,225,826 B2 * | 3/2019 | Tiirola | ............... | H04L 25/0224 |
| 10,333,679 B2 * | 6/2019 | Ahn | ................. | H04W 72/0446 |
| 10,396,876 B2 * | 8/2019 | Lee | ......................... | H04L 1/1812 |
| 10,531,479 B2 * | 1/2020 | Jung | ..................... | H04L 5/0055 |

(Continued)

FOREIGN PATENT DOCUMENTS

| | | | | |
|---|---|---|---|---|
| AU | 2016246295 A1 * | 9/2017 | ........... | H04L 1/0009 |
| EP | 3896878 A1 * | 10/2021 | ........... | H04L 1/0009 |
| JP | 2016-019272 A | 2/2016 | | |

OTHER PUBLICATIONS

International Search Report issued in PCT/JP2017/016854 dated Jun. 6, 2017 (1 page).

(Continued)

*Primary Examiner* — Jay P Patel
(74) *Attorney, Agent, or Firm* — Osha Bergman Watanabe & Burton LLP

(57) ABSTRACT

The present invention is designed so that, when a CP-OFDM waveform is supported in the UL in addition to DFT-spreading OFDM waveform, transmission of UCI can still be controlled adequately. According to the present invention, a user terminal has a transmission section that transmits uplink control information (UCI), and a control section that controls transmission of the UCI based on a waveform of an uplink (UL) data channel or based on indication information provided via higher layer signaling and/or downlink control information (DCI).

5 Claims, 16 Drawing Sheets

(56) References Cited

U.S. PATENT DOCUMENTS

| | | | | |
|---|---|---|---|---|
| 10,869,282 | B2* | 12/2020 | Kwak | H04L 5/0007 |
| 11,218,268 | B2* | 1/2022 | Takeda | H04L 5/023 |
| 11,229,029 | B2* | 1/2022 | Kang | H04W 72/0466 |
| 11,539,421 | B2* | 12/2022 | Kang | H04W 74/0833 |
| 2010/0008294 | A1* | 1/2010 | Palanki | H04J 11/00 370/328 |
| 2011/0268080 | A1* | 11/2011 | Luo | H04L 5/0053 370/330 |
| 2012/0127934 | A1* | 5/2012 | Anderson | H04W 72/0406 370/329 |
| 2013/0128854 | A1* | 5/2013 | Nakashima | H04L 1/1861 370/329 |
| 2014/0092865 | A1* | 4/2014 | Heo | H04J 3/1694 370/331 |
| 2015/0036618 | A1* | 2/2015 | Xu | H04L 5/0053 370/329 |
| 2015/0319753 | A1* | 11/2015 | Chen | H04L 5/001 370/277 |
| 2017/0126386 | A1* | 5/2017 | Chung | H04L 1/1614 |
| 2017/0142705 | A1* | 5/2017 | Chendamarai Kannan | H04L 1/1812 |
| 2018/0049173 | A1* | 2/2018 | Chen | H04W 72/044 |
| 2018/0054848 | A1* | 2/2018 | Yoo | H04W 76/25 |
| 2018/0097609 | A1* | 4/2018 | Tiirola | H04W 72/0413 |
| 2018/0124710 | A1* | 5/2018 | Ly | H04L 1/00 |
| 2018/0124815 | A1* | 5/2018 | Papasakellariou | H04L 1/1671 |
| 2018/0132264 | A1* | 5/2018 | Jung | H04L 1/1812 |
| 2018/0167933 | A1* | 6/2018 | Yin | H04L 5/0053 |
| 2018/0192416 | A1* | 7/2018 | Yin | H04L 1/1607 |
| 2018/0192417 | A1* | 7/2018 | Yin | H04L 1/1812 |
| 2018/0205534 | A1* | 7/2018 | Yi | H04W 72/044 |
| 2018/0206225 | A1* | 7/2018 | Li | H04L 1/1812 |
| 2018/0219649 | A1* | 8/2018 | Ying | H04W 76/27 |
| 2018/0220414 | A1* | 8/2018 | Yin | H04L 5/0053 |
| 2018/0220415 | A1* | 8/2018 | Yin | H04L 5/0053 |
| 2018/0234959 | A1* | 8/2018 | Ahn | H04W 72/042 |
| 2018/0278402 | A1* | 9/2018 | Zeng | H04W 72/1284 |
| 2018/0279291 | A1* | 9/2018 | Tiirola | H04B 1/713 |
| 2019/0089498 | A1* | 3/2019 | Pelletier | H04W 72/005 |
| 2019/0090126 | A1* | 3/2019 | Hayashi | H04W 72/0446 |
| 2019/0104515 | A1* | 4/2019 | Li | H04W 72/0413 |
| 2019/0110311 | A1* | 4/2019 | Falconetti | H04W 72/0453 |
| 2019/0132860 | A1* | 5/2019 | Bhorkar | H04L 5/0053 |
| 2019/0239214 | A1* | 8/2019 | Yang | H04W 72/21 |
| 2019/0246427 | A1* | 8/2019 | Mukherjee | H04L 5/001 |
| 2019/0260623 | A1* | 8/2019 | Li | H04L 27/2627 |
| 2019/0335478 | A1* | 10/2019 | Xiong | H04W 72/085 |
| 2019/0342038 | A1* | 11/2019 | Wiemann | H04W 16/14 |
| 2019/0356446 | A1* | 11/2019 | Kim | H04L 5/0053 |
| 2019/0364546 | A1* | 11/2019 | Kwak | H04W 72/042 |
| 2019/0372721 | A1* | 12/2019 | Lee | H04L 1/1861 |
| 2019/0373551 | A1* | 12/2019 | Sundberg | H04L 5/0028 |
| 2019/0373597 | A1* | 12/2019 | Bendlin | H04L 27/2613 |
| 2019/0379567 | A1* | 12/2019 | Kuchi | H04B 1/7103 |
| 2019/0380124 | A1* | 12/2019 | Kim | H04W 72/0413 |
| 2020/0008191 | A1* | 1/2020 | Wang | H04L 5/0055 |
| 2020/0014517 | A1* | 1/2020 | Takeda | H04L 5/0007 |
| 2020/0036470 | A1* | 1/2020 | Olesen | H04L 1/0025 |
| 2020/0037257 | A1* | 1/2020 | Yang | H04W 52/367 |
| 2020/0037260 | A1* | 1/2020 | Fu | H04L 5/0092 |
| 2020/0045691 | A1* | 2/2020 | Park | H04W 72/0413 |
| 2020/0052836 | A1* | 2/2020 | Li | H04L 5/1469 |
| 2020/0067681 | A1* | 2/2020 | Baldemair | H04L 5/0055 |
| 2020/0092876 | A1* | 3/2020 | Cho | H04W 72/0413 |
| 2020/0100241 | A1* | 3/2020 | Takeda | H04W 72/0413 |
| 2020/0100251 | A1* | 3/2020 | Yerramalli | H04W 16/14 |
| 2020/0106546 | A1* | 4/2020 | Takeda | H04W 72/0413 |
| 2020/0107315 | A1* | 4/2020 | Lyu | H04L 1/1829 |
| 2020/0107317 | A1* | 4/2020 | Ryu | H04W 72/0413 |
| 2020/0112397 | A1* | 4/2020 | Park | H04L 1/0067 |
| 2020/0128576 | A1* | 4/2020 | Jung | H04L 1/1861 |
| 2020/0137695 | A1* | 4/2020 | Papasakellariou | H04W 72/1289 |
| 2020/0137747 | A1* | 4/2020 | Xu | H04W 88/06 |
| 2020/0146037 | A1* | 5/2020 | Park | H04W 72/1278 |
| 2020/0214000 | A1* | 7/2020 | Akkarakaran | H04W 72/0413 |
| 2020/0267659 | A1* | 8/2020 | MolavianJazi | H04W 52/143 |
| 2020/0267667 | A1* | 8/2020 | MolavianJazi | H04W 72/042 |
| 2020/0275438 | A1* | 8/2020 | Jung | H04W 72/1289 |
| 2020/0322199 | A1* | 10/2020 | Matsumura | H04L 27/2613 |
| 2020/0389220 | A1* | 12/2020 | Kang | H04W 74/0833 |
| 2021/0136768 | A1* | 5/2021 | Kang | H04L 5/0053 |
| 2022/0183002 | A1* | 6/2022 | Yeo | H04L 5/0094 |

OTHER PUBLICATIONS

Written Opinion of the International Searching Authority issued in PCT/JP2017/016854 dated Jun. 6, 2017 (4 pages).

ETSI TS 136 300 V8.12.0; "LTE; Evolved Universal Terrestrial Radio Access (E-UTRA) and Evolved Universal Terrestrial Radio Access Network (E-UTRAN); Overall description; Stage 2 (3GPP TS 36.300 version 8.12.0 Release 8)"; Apr. 2010; (153 pages).

3GPP TSG RAN WG1 Meeting #88; R1-1703242 "UCI reporting on PUCCH and PUSCH" Sharp; Athens, Greece; Feb. 13-17, 2017 (3 pages).

3GPP TSG RAN WG1 Meeting #88bis; R1-1705744 "UCI and data multiplexing" NTT Docomo, Inc.; Spokane, USA; Apr. 3-7, 2017 (5 pages).

3GPP TSG RAN WG1 Meeting #88bis; R1-1706041 "On UCI on PUSCH" Ericsson; Spokane, US; Apr. 3-7, 2017 (2 pages).

Office Action issued in Japanese Application No. 2019-515005; dated Jun. 15, 2021 (6 pages).

* cited by examiner

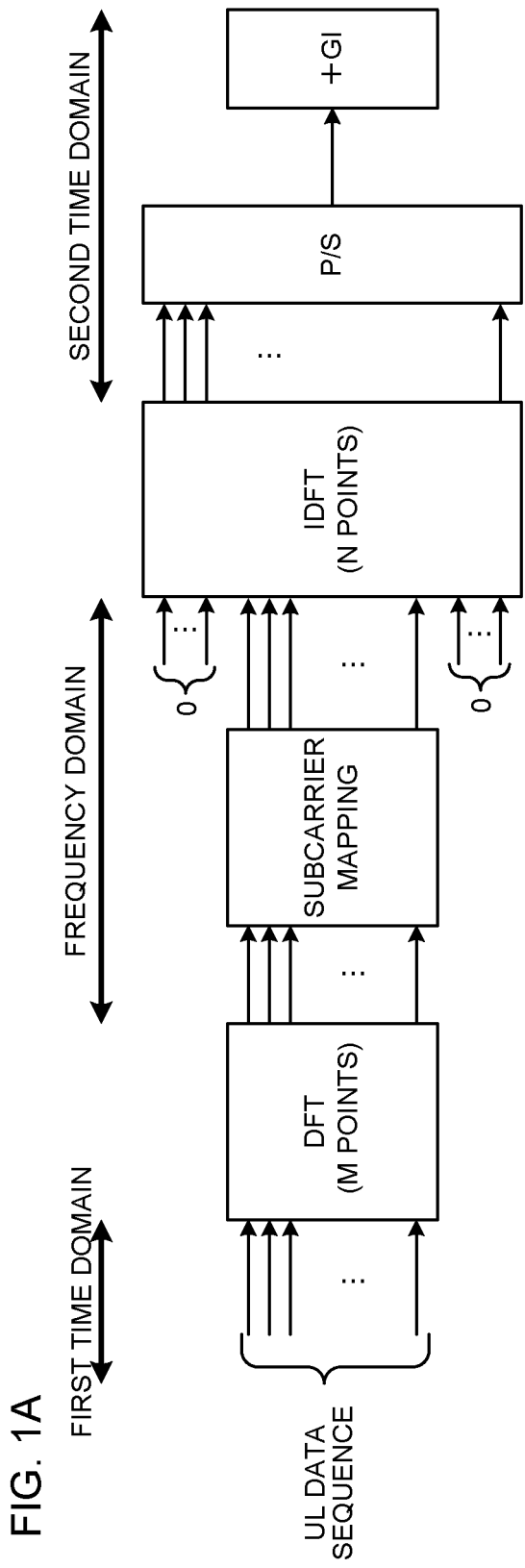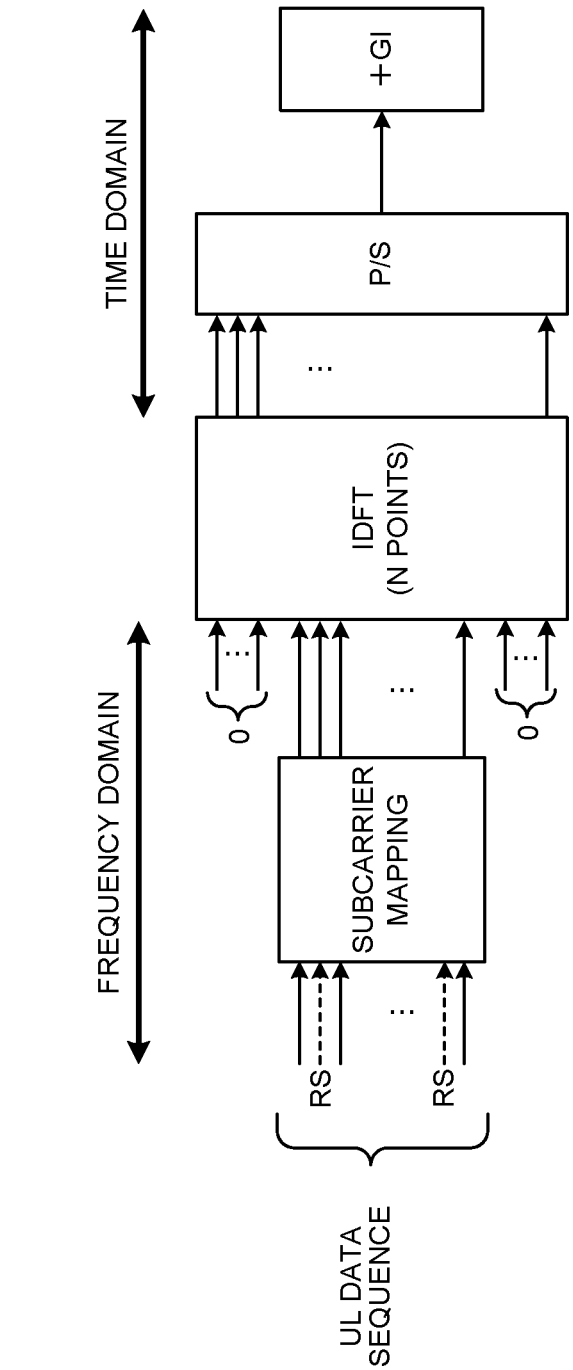
FIG. 1A
FIG. 1B

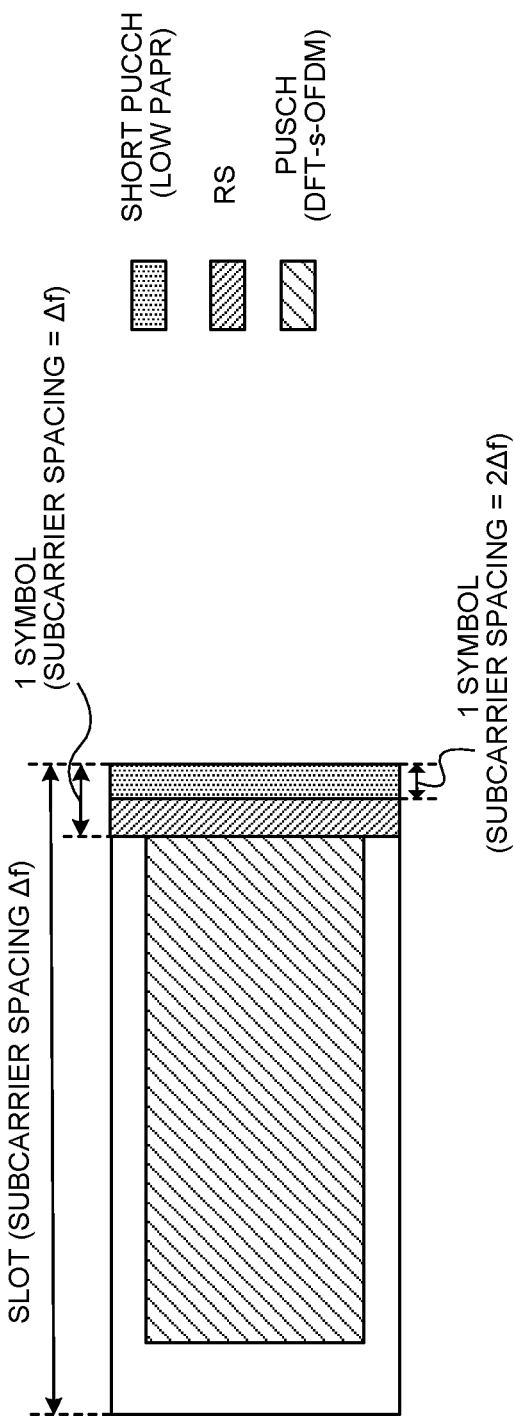
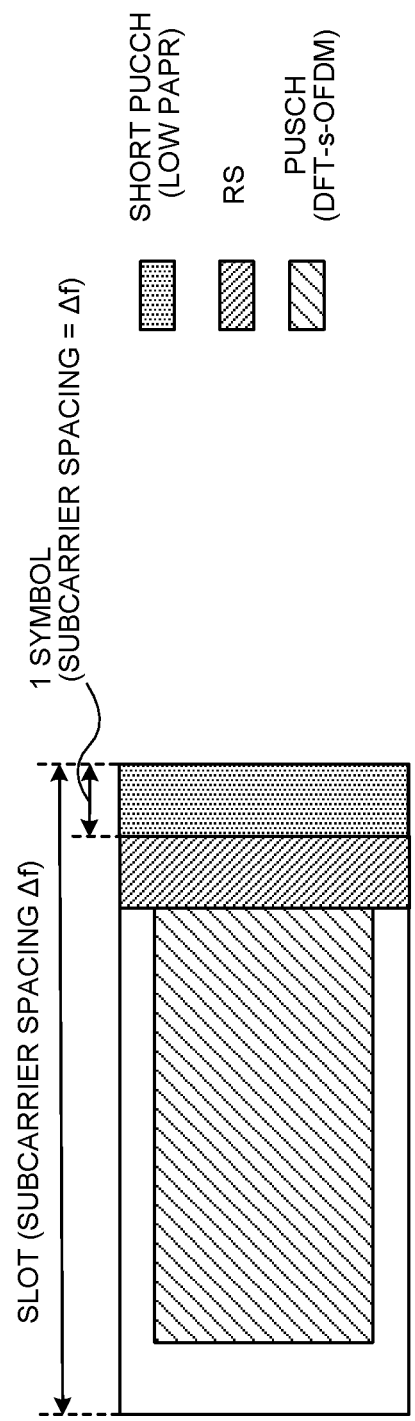
FIG. 5A
FIG. 5B

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long-term evolution (LTE) have been drafted for the purpose of further increasing high speed data rates, providing lower delays and so on (see non-patent literature 1). In addition, successor systems of LTE are also under study for the purpose of achieving further broadbandization and increased speed beyond LTE (referred to as, for example, "LTE-A (LTE-Advanced)," "FRA (Future Radio Access)," "4G," "5G," "5G+ (plus)," "NR (New RAT)," "LTE Rel. 14," "LTE Rel. 15 (or later versions)," and so on).

The uplink (UL) in existing LTE systems (for example, LTE Rel. 8 to 13) supports DFT-spread OFDM (Discrete Fourier Transform-Spread-Orthogonal Frequency Division Multiplexing (DFT-s-OFDM)) waveform. The DFT-spreading OFDM waveform is a single-carrier waveform, so that it is possible to prevent the peak-to-average power ratio (PAPR) from increasing.

Also, in existing LTE systems (for example, LTE Rel. 8 to 13), a user terminal transmits uplink control information (UCI) by using a UL data channel (for example, Physical Uplink Control CHannel (PUSCH)) and/or a UL control channel (for example, Physical Uplink Control CHannel (PUCCH)). The transmission of this UCI is controlled based on whether or not simultaneous transmission of the PUSCH and the PUCCH (also referred to as "simultaneous PUSCH and PUCCH transmission") is configured in the user terminal, and whether or not the user terminal transmits the PUSCH in the TTI where this UCI is transmitted.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall Description; Stage 2 (Release 8)," April, 2010

SUMMARY OF INVENTION

Technical Problem

Envisaging the UL of future radio communication systems (for example, LTE 5G, NR, etc.), research is underway to support the cyclic prefix-OFDM (CP-OFDM (Cyclic Prefix-Orthogonal Frequency Division Multiplexing)) waveform, which is a multi-carrier waveform, in addition to DFT-spreading OFDM waveform, which is a single-carrier waveform. Note that DFT-spreading OFDM waveform can be regarded as a UL signal, to which DFT spreading (also referred to as "DFT precoding" and the like) is applied, and the like (the phrase "with DFT spreading" may be used hereinafter to mean the same), and the CP-OFDM waveform can be regarded as a UL signal to which DFT spreading is not applied, and the like (the phrase "without DFT spreading" may be used hereinafter to mean the same).

In this way, if, in the UL of future radio communication systems where both DFT-spreading OFDM waveform and CP-OFDM waveform are supported, the transmission of UCI is controlled in the same way as in existing LTE systems where only DFT-spreading OFDM waveform is supported (for example, LTE Rel. 8 to 13), there is a possibility that the UCI cannot be transmitted properly.

For example, assuming that a PUSCH is transmitted in a DFT-spreading OFDM waveform having a lower PAPR than a CP-OFDM waveform, if UCI is transmitted using a PUCCH of a CP-OFDM waveform, it may not be possible to reserve the same coverage for this UCI as that of the PUSCH.

The present invention has been made in view of the above, and it is therefore an object of the present invention to provide a user terminal and a radio communication method, whereby, when CP-OFDM waveform is supported in the UL, in addition to DFT-spreading OFDM waveform, UCI transmission can still be controlled adequately.

Solution to Problem

According to one aspect of the present invention, a user terminal has a transmission section that transmits uplink control information (UCI) and a control section that controls transmission of the UCI based on a waveform of an uplink (UL) data channel or based on indication information provided via higher layer signaling and/or downlink control information (DCI).

Advantageous Effects of Invention

According to the present invention, when CP-OFDM waveform is supported in the UL, in addition to DFT-spreading OFDM waveform, user terminals can still control the transmission of UCI adequately.

BRIEF DESCRIPTION OF DRAWINGS

FIGS. 1A and 1B are diagrams, each showing an example of a PUSCH transmitter in future radio communication systems;

FIGS. 5A and 5B are diagrams to show examples of splitting-symbol PUCCHs according to the first example;

DESCRIPTION OF EMBODIMENTS

Figure 2A:
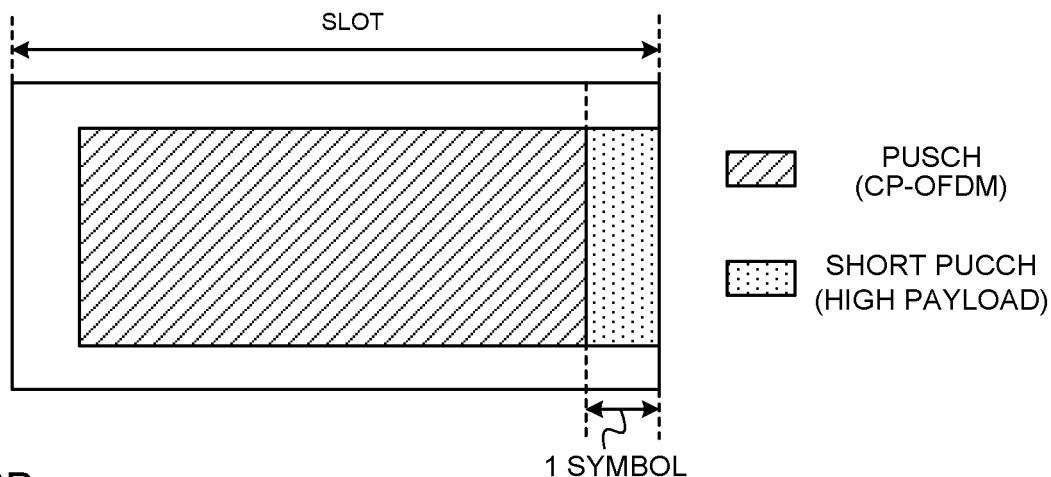
FIGS. 2A to 2C are diagrams to show examples of UCI transmission control according to a first example of the present invention.

In existing LTE systems (for example, LTE Rel. 13 and earlier versions), a user terminal controls the transmission of UCI based on whether or not simultaneous transmission of the PUSCH and the PUCCH is configured in the user terminal, and whether or not the user terminal transmits the PUSCH in the TTI where the UCI is transmitted.

To be more specific, when simultaneous transmission of the PUSCH and the PUCCH is not configured, if no PUSCH is transmitted in a TTI where UCI is transmitted, UCI is transmitted using a PUCCH. When a PUSCH is transmitted in this TTI, UCI is transmitted using the PUSCH (by piggybacking on the PUSCH).

On the other hand, when simultaneous transmission of the PUSCH and the PUCCH is configured, if no PUSCH is transmitted in a TTI in which UCI is transmitted, UCI is transmitted using a PUCCH. If a PUSCH is transmitted in this TTI, some UCIs are transmitted using a PUCCH, and other UCIs are transmitted using the PUSCH.

Envisaging the UL of future radio communication systems (for example, LTE 5G, NR, etc.), research is underway to support the cyclic prefix OFDM (CP-OFDM) waveform, which is a multi-carrier waveform (and which is a UL signal, to which DFT spreading (also referred to as "DFT precoding" and the like) is not applied (or "without DFT spreading")), in addition to DFT-spreading OFDM waveform, which is a single-carrier waveform (and which is a UL signal, to which DFT spreading is applied (or "with DFT spreading")).

Whether or not DFT spreading is applied to (which one of DFT-spreading OFDM waveform and CP-OFDM waveform is used for) the PUSCH might be configured in or indicated to a user terminal by using the network (for example, a radio base station).

FIG. 1 are diagrams, each showing an example of a PUSCH transmitter in future radio communication systems. FIG. 1A shows an example of a transmitter using the DFT-spreading OFDM waveform. As shown in FIG. 1A, UL data sequences after coding and modulation are subjected to a discrete Fourier transform (DFT) (or a fast Fourier transform (FFT)) of M points, converted from a first time domain to the frequency domain. Outputs of the DFT are mapped to M subcarriers, subjected to an inverse discrete Fourier transform (IDFT) (or an inverse fast Fourier transform (IFFT)) of N points, and converted from the frequency domain to a second time domain.

Here, N>M holds, and information that is input to the IDFT (or the IFFT) but not used is configured to zero. By this means, IDFT outputs give signals with little instantaneous power fluctuation, and their bandwidth depends on M. IDFT outputs are subjected to a parallel/serial (P/S) conversion, and then guard intervals (GIs) (also referred to as "cyclic prefixes (CPs)" and the like) are attached. In this way, signals that have characteristics of single-carrier communication are generated by DFT-spread OFDM transmitter, and transmitted in 1 symbol.

FIG. 1B shows an example of a transmitter using the CP-OFDM waveform. As shown in FIG. 1B, UL data sequences and/or reference signals (RSs), which have been encoded and modulated, are mapped to a number of subcarriers equal to the transmission bandwidth, and subjected to an IDFT (or an IFFT). Information that is input to the IDFT but not used is configured to zero. IDFT outputs are subject to a P/S conversion, and GIs are inserted. In this way, since the CP-OFDM transmitter uses multiple carriers, it is possible to frequency-division-multiplex RSs and UL data sequences.

Also, in future radio communication systems, the PUSCH is transmitted in a predetermined number of symbols. The number of symbols used to transmit the PUSCH is not fixed, and may be changed (variable) based on the number of symbols in one or more slots. For example, if 1 slot is constituted by 14 symbols, the PUSCH can be transmitted by using 1 to 14 symbols when 1 slot is used, and, can be transmitted by using 28 symbols, 56 symbols or the like when 2 or 4 slots are used.

Furthermore, in future radio communication systems, the PUCCH is transmitted using a predetermined number of symbols in a slot. The number of symbols used to transmit the PUCCH is not fixed, and may be changed (variable). For example, research is underway to support a PUCCH that is structured to be shorter in duration (for example, 1 or 2 symbols) (hereinafter also referred to as a "short PUCCH") than PUCCH formats 1 to 5 of existing LTE systems (for example LTE Rel. 13 and earlier versions) and/or, a PUCCH that is structured to have a longer duration than the above short duration (hereinafter also referred to as a "long PUCCH").

When a short PUCCH is used, while it is desirable to frequency-division-multiplex (FDM) UCI and RSs, by using a CP-OFDM waveform, to increase the payload, there is a possibility that the PAPR might increase. Meanwhile, when a DFT-spreading OFDM waveform is used to lower the PAPR, it is necessary to time-division-multiplex (TDM) UCI and RSs (because these cannot be frequency-division-multiplexed (FDM)), and so the payload might decrease. Consequently, it is possible to say that the waveform of a short PUCCH is determined based on the payload. Meanwhile, as mentioned earlier, it is assumed that the waveform of a PUSCH is determined by configuration or indication from the network (for example, a radio base station), regardless of the payload.

In this way, in the UL of future radio communication systems where both DFT-spreading OFDM waveform and CP-OFDM waveform are supported, when the transmission of UCI is controlled in the same way as in existing LTE systems where only DFT-spreading OFDM waveform is supported (for example, LTE Rel. 8 to 13), there is a possibility that UCI cannot be transmitted properly.

For example, assuming that a PUSCH is transmitted in a DFT-spreading OFDM waveform having a lower PAPR than a CP-OFDM waveform, if UCI is transmitted using a PUCCH of a CP-OFDM waveform, it may not be possible to reserve the same coverage for this UCI as that of the PUSCH.

So the present inventors have worked on a method of controlling the transmission of UCI appropriately even when CP-OFDM waveform is supported in the UL in addition to DFT-spreading OFDM waveform, and arrived at the present invention.

Now, the present embodiment will be described below. Hereinafter, the CP-OFDM waveform will be shown as an example of a multi-carrier waveform and DFT-spreading OFDM waveform will be shown as an example of a single-carrier waveform, but the present embodiment can be appropriately applied to other multi-carrier waveforms than the CP-OFDM waveform, and to other single-carrier waveforms than DFT-spreading OFDM waveform. In addition, a single-carrier waveform may be interpreted as meaning a waveform to which DFT spreading is applied, and a multi-carrier waveform may be interpreted as meaning a waveform to which DFT spreading is not applied.

Note that, according to the present embodiment, UCI may contain at least one of a scheduling request (SR), delivery acknowledgment information (also referred to as "HARQ-ACK (Hybrid Automatic Repeat reQuest-Acknowledgement)," "ACK" or "NACK (Negative ACK)," "A/N," and so on) in response to DL data channels (for example, Physical Downlink Shared CHannel (PDSCH)), channel state information (CSI), beam index information (BI), and a buffer status report (BSR).

First Example

According to a first example of the present invention, a user terminal controls the transmission of UCI based on the waveform of the PUSCH (hereinafter also referred to as "PUSCH waveform").

To be more specific, when the waveform of a PUSCH is a CP-OFDM waveform (multi-carrier waveform), UCI is transmitted using a short PUCCH of the CP-OFDM waveform (first UL control channel). On the other hand, when the waveform of a PUSCH is a DFT-spreading OFDM waveform (single-carrier waveform), UCI is transmitted using this PUSCH, or at least part of UCI (for example, HARQ-ACK, SR, etc.) is transmitted using a short PUCCH of the DFT-spreading OFDM waveform (second UL control channel).

Here, the short PUCCH of the CP-OFDM waveform (first UL control channel) may be frequency-division-multiplexed (FDM) and/or time-division-multiplexed (TDM) with the PUSCH. Also, in the short PUCCH of the CP-OFDM waveform, an RS and UCI may be frequency-division-multiplexed (FDM), so that the payload can be increased compared to the short PUCCH of the DFT-spreading OFDM waveform (second UL control channel) where an RS and UCI cannot be frequency-division-multiplexed (FDM). Therefore, the short PUCCH of the CP-OFDM waveform may be referred to as a "high-payload short PUCCH" (which will be described in detail later).

In addition, since the short PUCCH of the DFT-spreading OFDM waveform (second UL control channel) assumes a single-carrier waveform, a low-PAPR can be achieved. Therefore, the short PUCCH of the DFT-spreading OFDM waveform may be referred to as a "short PUCCH of low PAPR" (which will be described in detail later).

The user terminal may select the PUSCH waveform (that is, whether or not to apply DFT-spreading to the PUSCH) based on (1) higher layer signaling (for example, Radio Resource Control (RRC) signaling) and/or (2) L1 signaling (for example, downlink control information (DCI)). A field to indicate the PUSCH waveform in an explicit way may be provided in DCI (for example, a UL grant for scheduling the PUSCH), or a predetermined field in DCI may indicate the PUSCH waveform in an implicit way.

For example, when 1 layer is indicated in the MIMO indicator field (also referred to as "precoding information," "precoding information and the number of layers," etc.) in the DCI, the user terminal may determine that the PUSCH waveform is a DFT-spreading OFDM waveform (with DFT-spreading). Meanwhile, when 2 or more layers are indicated in the MIMO indicator field, the user terminal may determine that the PUSCH waveform is a CP-OFDM waveform (without DFT-spreading).

Alternatively, if the resource allocation (RA) field in the DCI indicates that contiguous PRBs are allocated to the PUSCH, the user terminal may determine that the PUSCH waveform is a DFT-spreading OFDM waveform (with DFT-spreading). Meanwhile, if the RA field indicates that non-contiguous PRBs are allocated, the user terminal may determine that the PUSCH waveform is a CP-OFDM waveform (without DFT-spreading).

Alternatively, if DCI is detected in a search space that is common to one or more user terminals (also referred to as a "common search space" or a "group search space" and the like), a user terminal may determine that the PUSCH waveform is a DFT-spreading OFDM waveform (with DFT spreading). On the other hand, if DCI is detected in a user terminal-specific search space (UE-specific search space), the user terminal may determine that the PUSCH waveform is a CP-OFDM waveform (without DFT spreading).

Figure 2B:
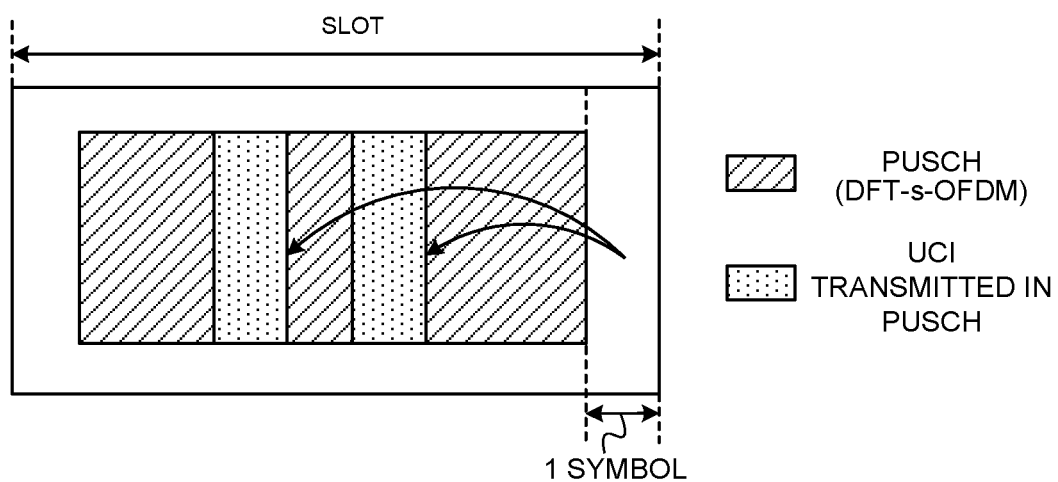
Figure 2C:
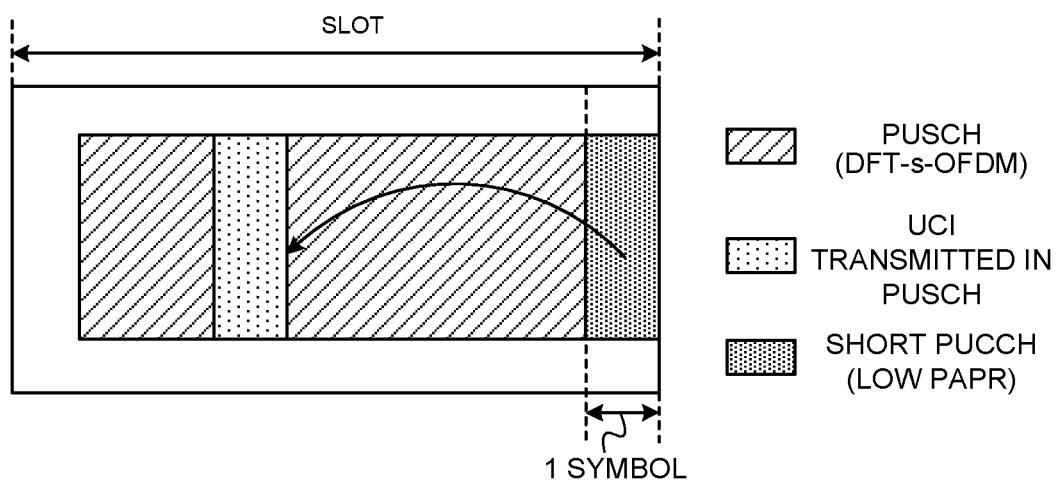

FIG. 2 provide diagrams to show examples of UCI transmission control according to the first example. For example, FIG. 2A shows a case where the PUSCH waveform is a CP-OFDM waveform, and FIGS. 2B and 2C show cases where the PUSCH waveform is a DFT-spreading OFDM waveform.

As shown in FIG. 2A, when a PUSCH of a CP-OFDM waveform is scheduled in a slot, a user terminal may transmit UCI by using a short PUCCH of high payload (also referred to as a "short PUCCH of a CP-OFDM waveform," "first UL control channel," etc.). Note that, in FIG. 2A, this high-payload short PUCCH is allocated to the last symbol of the slot, but the number of symbols and/or the location where this short PUCCH is allocated are not limited to those shown in FIG. 2A.

In the case shown in FIG. 2A, the waveforms of both the PUSCH and the short PUCCH transmitted in the same slot are CP-OFDM waveforms, so that it is possible to prevent coverage imbalance between the PUSCH and the short PUCCH, and, furthermore, increase the payload of the PUSCH and the short PUCCH.

Meanwhile, as shown in FIGS. 2B and 2C, when a PUSCH of a DFT-spreading OFDM waveform is scheduled in a slot, the user terminal may suspend the UCI transmission using the high-payload short PUCCH shown in FIG. 2A.

Referring to FIG. 2B, in the slot where the PUSCH of the DFT-spreading OFDM waveform is scheduled, the user terminal may transmit the UCI using this PUSCH (the UCI may piggyback on the PUSCH). To be more specific, the user terminal may puncture at least part of the UL data that is transmitted in the PUSCH, and insert the UCI there. When doing so, the user terminal may insert the UCI prior to DFT-spreading, so that the PAPR of the PUSCH after DFT-spreading can be kept low. Furthermore, when puncturing is executed according to the first example, all the PRBs of the PUSCH in a predetermined symbol may be punctured, or only part of the PRBs (or subcarriers) may be punctured.

Alternatively, as shown in FIG. 2C, when a PUSCH of a DFT-spreading OFDM waveform is scheduled in a slot, the user terminal may transmit at least part of the UCI (for example, HARQ-ACK and/or SR) by using a short PUCCH of low PAPR (also referred to as a "short PUCCH of a DFT-spreading OFDM waveform," "second UL control channel," etc.). Also, the user terminal may transmit different UCI (for example, CSI) by using this PUSCH. Note that, in FIG. 2C, this low-payload short PUCCH is allocated to the last symbol of the slot, but the number of symbols and/or the location where this short PUCCH is allocated are not limited to those shown in FIG. 2C.

In the cases shown in FIGS. 2B and 2C, the use of the high-payload short PUCCH having a different waveform from the DFT-spreading OFDM waveform of the PUSCH is suspended, so that it is possible to prevent coverage imbalance between the PUSCH and the short PUCCH in the same slot.

Also, in the cases shown in FIGS. 2B and 2C, part of the UL data is punctured and at least part of the UCI is transmitted there, so that receiving processes for this UCI (for example, at least one of channel estimation, demodulation and decoding) can be performed based on the RS multiplexed on the PUSCH. Therefore, compared to the case this UCI is transmitted by using the short PUCCH of low PAPR (see, for example, FIGS. 9B and 9C, which will be described later), the overhead of RSs for this short PUCCH can be reduced.

Here, the formats of the PUCCH of low-PAPR (also referred to as a "short PUCCH of a DFT-spreading OFDM waveform," "second UL control channel," etc.), and the short PUCCH of high payload (also referred to as a "short PUCCH of a CP-OFDM waveform," "first UL control channel," etc.) will be described in detail.

<Low-PAPR Short PUCCH>

The short PUCCH of low PAPR has a DFT-spreading OFDM waveform, and may be comprised of a predetermined number of symbols (for example, 1 or 2 symbols) of the same subcarrier spacing as that of the PUSCH. The low-PAPR short PUCCH, when comprised of 1 symbol, may be constituted by one of, for example, (1) a sequence-based PUCCH, (2) a pre-DFT-based PUCCH, and a (3) splitting-symbol PUCCH. Furthermore, the low-PAPR short PUCCH, when comprised of 2 or more symbols, may be constituted by one of, for example, (1) a sequence-based PUCCH, (2) pre-DFT-based PUCCH, and (3) TDM-based PUCCH.

(1) Sequence-Based PUCCH

A sequence-based PUCCH refers to a format in which UCI is reported implicitly by using transmission resources. For example, the transmission resources may be at least one of base sequences, amounts of phase rotation (also referred to as "cyclic shifts" and the like), and Orthogonal Cover Codes (OCCs). A sequence-based PUCCH may be referred to as "non-coherent transmission," "non-coherent design," and the like.

Figure 3A:
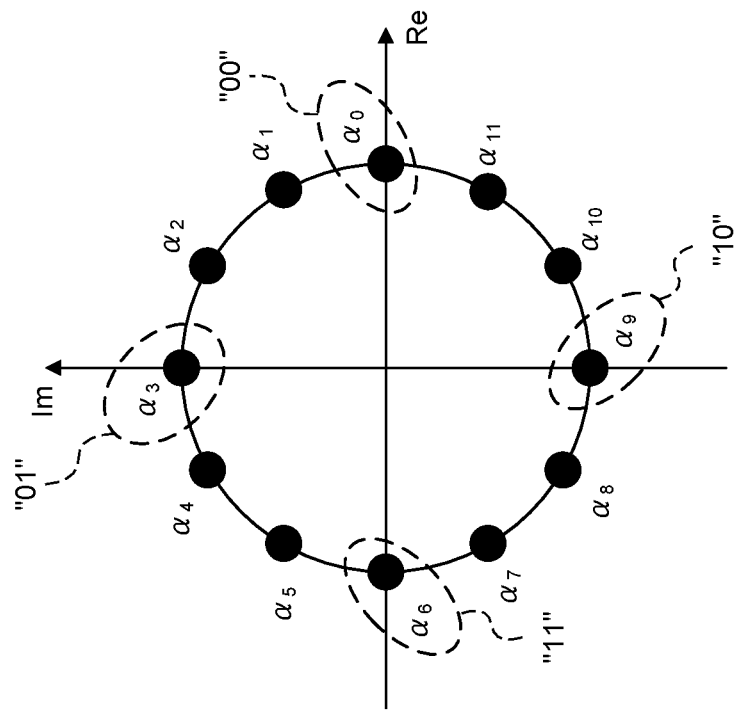
FIGS. 3A and 3B are diagrams to show examples of sequence-based PUCCHs according to the first example.
Figure 3B:
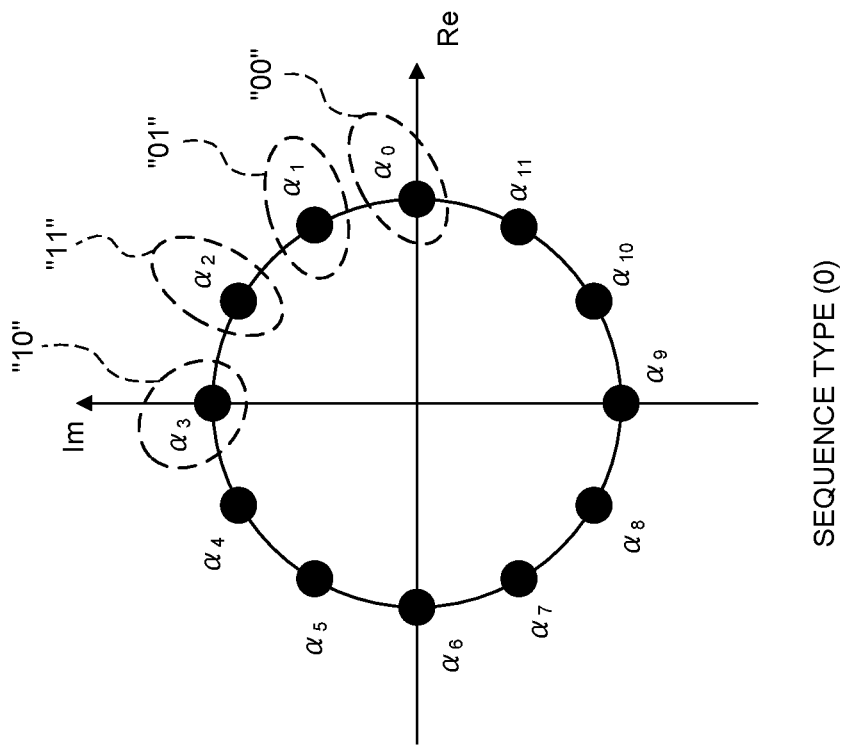

FIG. 3 provide diagrams to show examples of sequence-based PUCCHs according to the first example. Every value of UCI is associated with a transmission resource (here, an amount of phase rotation) in advance. For example, in FIG. 3A, the 2-bit UCI values "00," "01," "10" and "11" are associated with amounts of phase rotation $\alpha_0$, $\alpha_1$, $\alpha_2$ and $\alpha_3$, each spaced apart by $\pi/6$. Also, in FIG. 3B, the 2-bit UCI values "00," "01," "10," and "11" are associated with amounts of phase rotation $\alpha_0$, $\alpha_3$, $\alpha_6$ and $\alpha_9$, each spaced apart by $\pi/2$. In an environment where the frequency selectivity is severe, the cross-correlation between sequences generated based on neighboring amounts of phase rotation is high, so that FIG. 3B, in which UCI values are associated with discrete amounts of phase rotation, is suitable.

Note that, although FIG. 3 show examples in which every value of UCI is associated with an amount of phase rotation, this is by no means limiting, and each value of UCI has only to be associated with at least one of a base sequence, an amount of phase rotation and an OCC. A base sequence may refer to a base sequence for the demodulation RS.

Even when a short PUCCH is comprised of 1 symbol, the use of a sequence-based PUCCH allows implicit reporting of UCI values by using transmission resources (the amounts of phase rotation in FIGS. 3A and 3B), without frequency-division-multiplexing (FDM) RSs and UCI. Consequently, even when a DFT-spreading OFDM waveform is applied to a short PUCCH comprised of 1 symbol, a low PAPR can be achieved. Note that a sequence-based PUCCH can also be applied to short PUCCHs comprised of 2 or more symbols.

(2) Pre-DFT-based PUCCH

Figure 4:
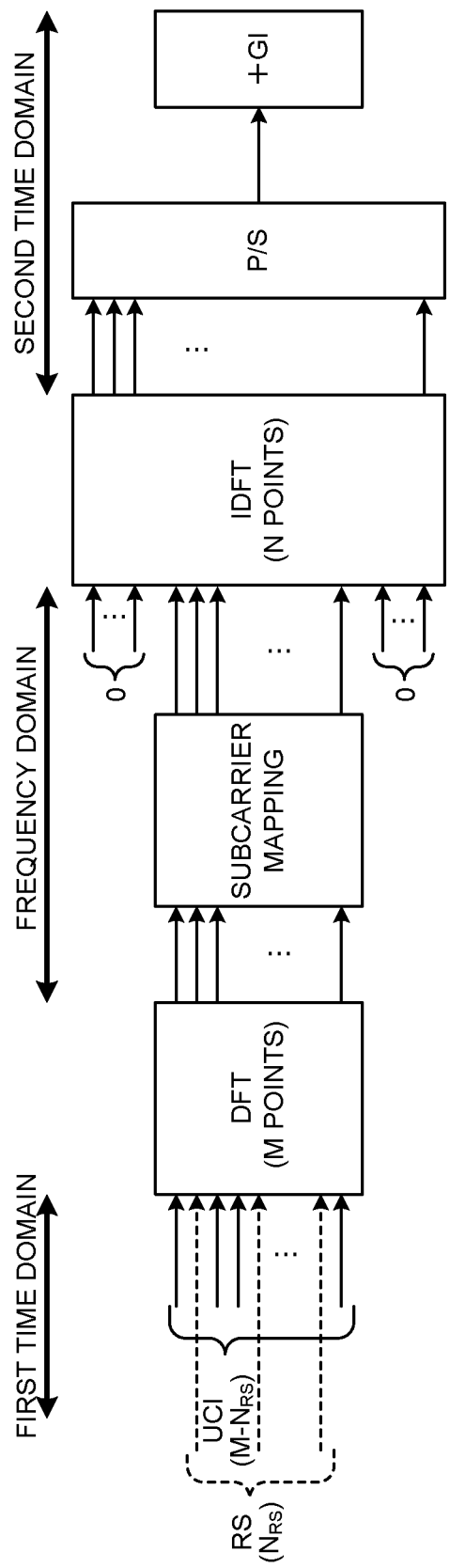
FIG. 4 is a diagram to show an example of a pre-DFT-based PUCCH according to the first example.

A pre-DFT-based PUCCH refers to a format in which UCI and RSs are multiplexed prior to DFT-spreading. FIG. 4 is a diagram to show an example of a pre-DFT-based PUCCH according to the first example. For example, referring to FIG. 4, transmission sequences of M samples, which include UCI sequences of M-$N_{RS}$ samples and RS sequences of $N_{RS}$ samples, are input to a DFT, and converted from a first time domain to the frequency domain.

DFT outputs are mapped to M subcarriers, subjected to an IDFT of N points, and converted from the frequency domain to a second time domain. Here, N>M holds, and information that is input to the IDFT but not used is configured to zero. By this means, IDFT outputs give signals with little instantaneous power fluctuation, and their bandwidth depends on M. The processing after exit from the IDFT is the same as shown in FIG. 1A.

In the pre-DFT-based PUCCH, as shown in FIG. 4, UCI and RSs are multiplexed in the first time domain, prior to entry to DFT, so that UCI and an RS can be placed on a single-carrier waveform and transmitted. Therefore, even when a DFT-spreading OFDM waveform is applied to a short PUCCH comprised of 1 symbol, a low PAPR can be achieved. Note that a sequence-based PUCCH can also be applied to short PUCCHs comprised of 2 or more symbols.

(3) Splitting-Symbol PUCCH

A splitting-symbol PUCCH refers to a PUCCH having a format in which, within 1 symbol of a given subcarrier spacing, an RS and UCI are time-division-multiplexed in multiple symbols that are provided at a higher (wider) subcarrier spacing than the former given subcarrier spacing.

Given that subcarrier spacing and the duration of symbols are reciprocal, if the subcarrier spacing is higher (wider), the symbol duration becomes shorter. Future radio communication systems (for example, 5G, NR, etc.) support at least one subcarrier spacing among 15 kHz, 30 kHz, 60 kHz and 120 kHz. Therefore, within 1 symbol in a slot in which a PUSCH is scheduled, a number of symbols can be provided at a higher subcarrier spacing than the subcarrier spacing of the PUSCH. Therefore, an RS and UCI may be time-division-multiplexed using these multiple symbols.

FIG. 5 provide diagrams to show examples of splitting-symbol PUCCHs according to the first example. In FIG. 5A, within 1 symbol where the subcarrier spacing is $\Delta f$ (for example, 15 kHz), 2 symbols are provided at a subcarrier spacing of 2Δf (for example, 30 kHz), which is twice as large. An RS is mapped to one of the symbols of subcarrier spacing 2Δf, and UCI is mapped to the other symbol. Note that the subcarrier spacing for a splitting-symbol PUCCH does not necessarily have to be twice the subcarrier spacing of the PUSCH, and may be four times as large, eight times as large, and so on.

In a splitting-symbol PUCCH, an RS and UCI can be time-division-multiplexed (TDM) on multiple symbols at a higher subcarrier spacing than the subcarrier spacing of the PUSCH. Therefore, even when a DFT-spreading OFDM waveform is applied to a short PUCCH comprised of 1 symbol of the subcarrier spacing of the PUSCH, a low PAPR can be achieved.

(4) TDM-based PUCCH

A TDM-based PUCCH refers to a PUCCH having a format in which an RS and UCI are time-division-multiplexed in multiple symbols. For example, referring to FIG. 5B, when there are 2 symbols at a subcarrier spacing Δf of the PUSCH, an RS is mapped to 1 symbol, and UCI is mapped to the other symbol.

As shown in FIG. 5B, when a TDM-based PUCCH is comprised of 2 or more symbols at the subcarrier spacing of the PUSCH, even when a DFT-spreading OFDM waveform is used, a low PAPR can be achieved.

<High-Payload Short PUCCH>

A high-payload short PUCCH may have a CP-OFDM waveform, and may be comprised of a predetermined number of symbols (for example, 1 or 2 symbols). As the high-payload short PUCCH, for example, one of an FDM-based PUCCH, a TDM-based PUCCH, and a hybrid TDM/FDM-based PUCCH may be used.

Figure 6A:
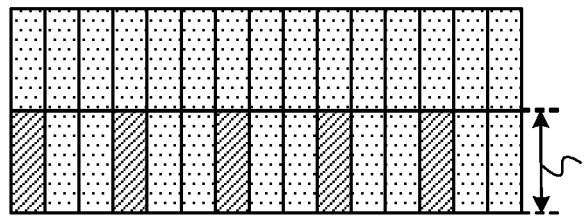
FIGS. 6A to 6C are diagrams to show examples of high-payload short PUCCHs according to the first example.

FIG. 6 provide diagrams to show examples of high-payload short PUCCHs. FIG. 6A shows an FDM-based PUCCH. An FDM-based PUCCH refers to a format in which an RS and UCI are frequency-division-multiplexed (FDM). The FDM-based PUCCH is comprised of 1 symbol or multiple symbols.

Figure 6B:
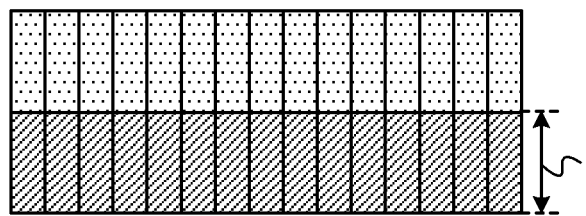

For example, as shown in FIG. 6A, when UCI and an RS are mapped to different subcarriers at a ratio of 2:1, the proportion of the RS to the UCI can be made lower than 50%, so that, compared to the TDM-based PUCCH shown in FIG. 6B, the payload can be increased.

FIG. 6B shows a TDM-based PUCCH. A TDM-based PUCCH refers to a format in which an RS and UCI are time-division-multiplexed (TDM). The TDM-based PUCCH is comprised of a number of symbols (for example, 2 symbols). As shown in FIG. 6B, when the TDM-based PUCCH is comprised of 2 symbols, the proportion of the RS to the UCI is 50%.

Figure 6C:
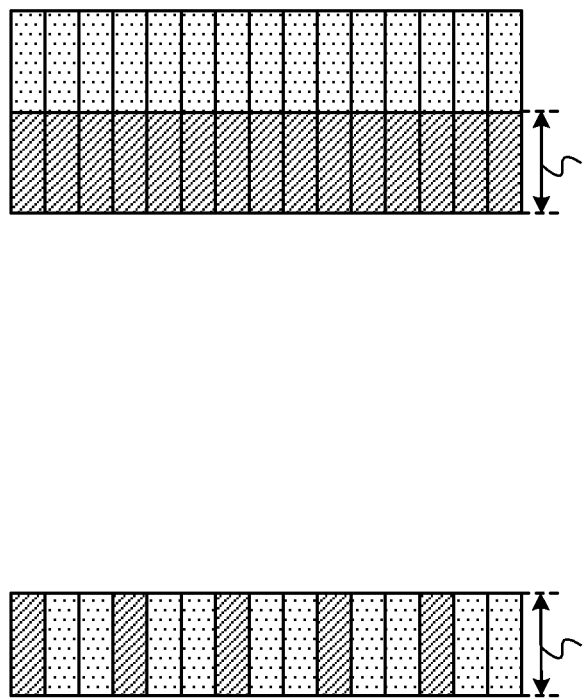

FIG. 6C shows a hybrid TDM/FDM-based PUCCH. A hybrid TDM/FDM-based PUCCH refers to a PUCCH of a format, in which an RS and UCI are frequency-division-multiplexed (FDM) and time-division-multiplexed (TDM), and which is comprised of a number of symbols.

For example, as shown in FIG. 6C, an RS and UCI may be frequency-division-multiplexed in the first symbol constituting the hybrid TDM/FDM-based PUCCH, and UCI may be mapped to the second symbol. In this manner, by increasing the number of symbols to map UCI, it is possible to increase the payload compared to FIGS. 6A and 6B.

As described above, according to the first example, when the waveform of a PUSCH is a DFT-spreading OFDM waveform, UCI is transmitted using a PUCCH of low PAPR, so that it is possible to secure coverage for both the PUSCH and the UCI. Note that, since the number of bits (payload) that can be communicated by the low-PAPR PUCCH is smaller than that of a high-payload PUCCH, at least part of the UCI may be piggybacked on the PUSCH.

Second Example

According to a second example of the present invention, when there is no PUSCH to transmit, a user terminal controls the transmission of UCI based on indication information that is provided through higher layer signaling and/or DCI. Now, the second example will be described below, primarily focusing on differences from the first example.

To be more specific, when there is no PUSCH to transmit and the above indication information fulfills given condition A, a user terminal transmits this UCI by using a short PUCCH of a CP-OFDM waveform (multi-carrier waveform) (first UL control channel).

Meanwhile, if there is no PUSCH to transmit and the above indication information does not fulfill a given condition A or fulfills given condition B, the user terminal transmits at least part of the UCI by using a short PUCCH of a DFT-spreading OFDM waveform (single-carrier waveform) (second UL control channel), or transmits the above UCI by using a long PUCCH (third control channel), which has a longer time duration than the above short PUCCH.

Here, the short PUCCH of a CP-OFDM waveform (first UL control channel) may be the "high-payload short PUCCH" that has been described earlier with the first example. Furthermore, the short PUCCH of a DFT-spreading OFDM waveform (second UL control channel) may be the "low-PAPR short PUCCH," which also has been described earlier with the first example.

Also, the long PUCCH (third UL control channel) uses a DFT-spreading OFDM waveform, so that a low PAPR can be achieved. In addition, since the long PUCCH has a longer time duration than the short PUCCH, the coverage can be expanded compared to the short PUCCH. In order to provide a power boosting effect, the long PUCCH can be comprised of fewer frequency resources (for example, 1 or 2 PRBs) than the short PUCCH. In addition, the long PUCCH may be applied frequency hopping per predetermined period within a slot (for example, per mini-slot (sub-slot)).

Furthermore, the above given condition A may be fulfilled in one of the following cases. For example, (1) when indication information that is provided through higher layer signaling indicates UCI transmission using a high-payload short PUCCH (also referred to as a "short PUCCH of a CP-OFDM waveform," "first UL control channel," etc.), this indication information may fulfill given condition A. Alternatively, (2) when indication information that is provided by DCI indicates UCI transmission using the high-payload short PUCCH, in an explicit way or in an implicit way, this indication information may fulfill given condition A.

For example, the user terminal may select UCI transmission using the high-payload short PUCCH based on the details of the indication of the PUCCH resource allocation field in the DCI. Alternatively, the user terminal may select UCI transmission using the high-payload short PUCCH when this DCI is detected in a common search space. Alternatively, the user terminal may select UCI transmission using the high-payload short PUCCH when the PUSCH waveform configured by higher layer signaling is a CP-OFDM waveform.

Furthermore, above given condition B is fulfilled when given condition A is not fulfilled. For example, (1) when indication information provided through higher layer signaling indicates UCI transmission using a low-PAPR short PUCCH (also referred to as a "short PUCCH of a DFT-spreading OFDM waveform," "second UL control channel," etc.), this indication information may fulfill given condition B. Alternatively, (2) when indication information that is provided by DCI indicates UCI transmission using the low-PAPR short PUCCH, in an explicit way or in an implicit way, this indication information may fulfill given condition B.

For example, the user terminal may select UCI transmission using the low-PAPR short PUCCH based on the details of the indication of the PUCCH resource allocation field in the DCI. Alternatively, the user terminal may select UCI transmission using the low-PAPR short PUCCH when this DCI is detected in a UE-specific search space. Alternatively, the user terminal may select UCI transmission using the low-payload short PUCCH when the PUSCH waveform configured by higher layer signaling is a DFT-spreading OFDM waveform.

Figure 7A:
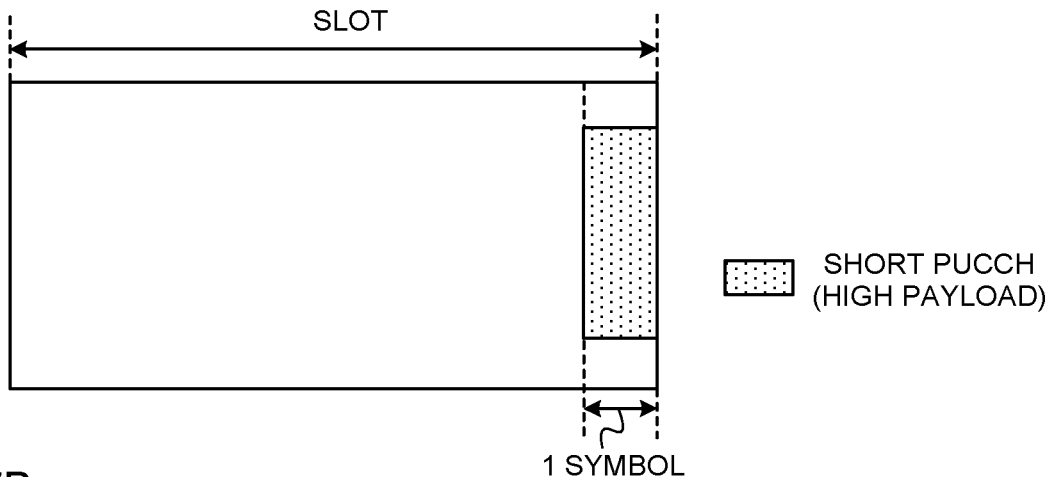
FIGS. 7A to 7C are diagrams to show examples of UCI transmission control according to a second example of the present invention.
Figure 7B:
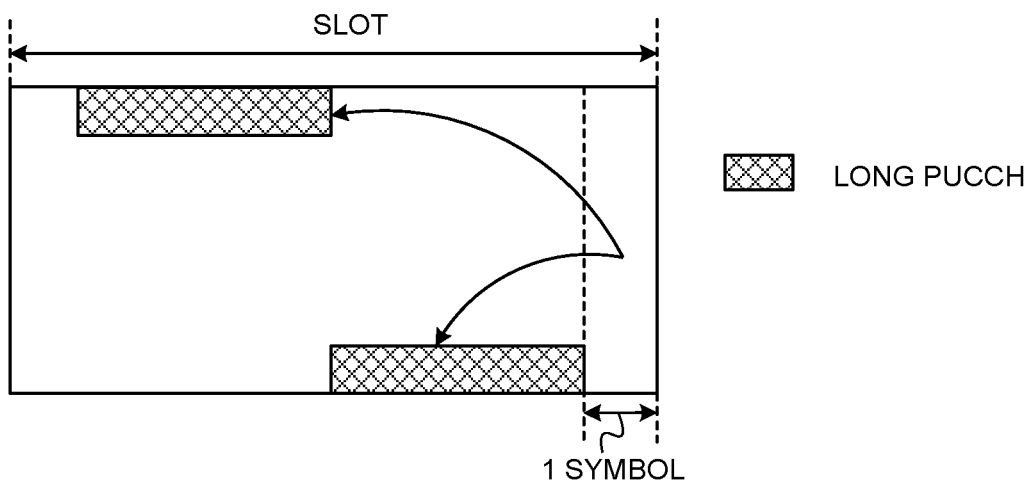
Figure 7C:
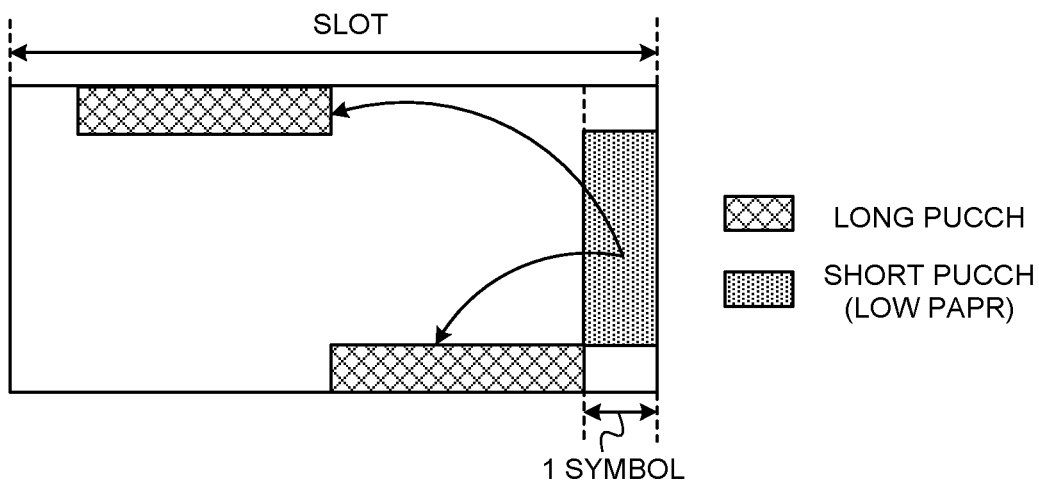

FIG. 7 provide diagrams to show examples of UCI transmission control according to the second example. For example, FIG. 7A shows a case where indication information that is provided through higher layer signaling and/or DCI fulfills above given condition A. FIGS. 7B and 7C show a case where this indication information does not fulfill given condition A, and a case where this indication information fulfills above given condition B.

As shown in FIG. 7A, when above given condition A is fulfilled in a slot in which no PUSCH is transmitted, the user terminal may transmit UCI by using a high-payload short PUCCH (also referred to as a "short PUCCH of a CP-OFDM waveform," "first UL control channel," etc.). In the case shown in FIG. 7A, UCI is transmitted by using the high-payload short PUCCH when there is no PUSCH, so that it is possible to increase the payload that can be communicated.

Meanwhile, as shown in FIG. 7B, when above given condition A is not fulfilled or above given condition B is fulfilled in a slot in which no PUSCH is transmitted, the user terminal may transmit UCI using a long PUCCH. In the case shown in FIG. 7B, when there is no PUSCH, UCI is transmitted using a long PUCCH, which carries a greater payload than a short PUCCH does, so that it is possible to reduce the PAPR, and, furthermore, increase the payload that can be communicated.

Alternatively, as shown in FIG. 7C, when given condition A is not fulfilled or given condition B is fulfilled in a slot in which no PUSCH is transmitted, the user terminal may transmit at least part of the UCI (for example, HARQ-ACK and/or SR) by using a low-PAPR short PUCCH (also referred to as a "short PUCCH of a DFT-spreading OFDM waveform," "second UL control channel," etc.). Also, the user terminal may transmit different UCI (for example, CSI) by using this long PUCCH.

In the case shown in FIG. 7C, when there is no PUSCH, UCI that cannot be transmitted using a low-PAPR short PUCCH can be transmitted by means of the long PUCCH, so that it is possible to reduce the PAPR, and, furthermore, increase the payload of UCI that can communicate within 1 slot more than shown in FIG. 7B.

As described above, according to the second example, when there is no PUSCH to transmit, the transmission of UCI is controlled based on indication information that is provided through higher layer signaling and/or DCI, so that it is possible to control the transmission of UCI appropriately using a PUCCH of a DFT-spreading OFDM waveform or a CP-OFDM waveform.

Third Example

According to a third example of the present invention, when there is a PUSCH to be transmitted, a user terminal controls the transmission of UCI based on indication information that is provided through higher layer signaling and/or DCI. Now, the third example will be described below, primarily focusing on differences from the first and/or the second examples. Note that predetermined conditions A and B are the same as those described in the second example.

To be more specific, when there is a PUSCH to transmit and the above indication information fulfills predetermined condition A, the user terminal transmits UCI by using a short PUCCH of a CP-OFDM waveform (multi-carrier waveform) (first UL control channel).

Meanwhile, when there is a PUSCH to transmit and the above indication information does not fulfill predetermined condition A or fulfills predetermined condition B, the user terminal transmits at least part of the UCI by using a short PUCCH of a DFT-spreading OFDM waveform (single-carrier waveform) (second UL control channel), or transmits the above UCI by using a long PUCCH (third control channel), which has a longer time duration than the above short PUCCH.

Figure 8A:
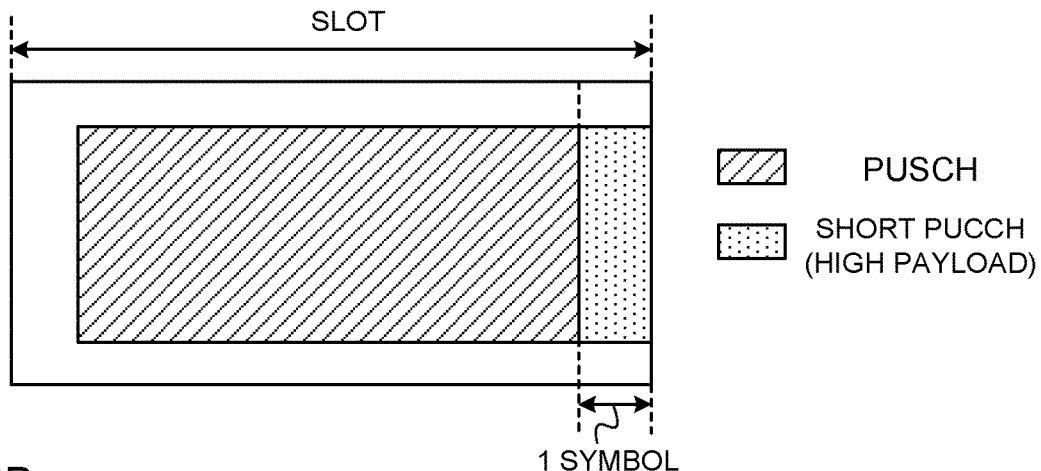
FIGS. 8A to 8C are diagrams to show examples of UCI transmission control according to a third example of the present invention.
Figure 8B:
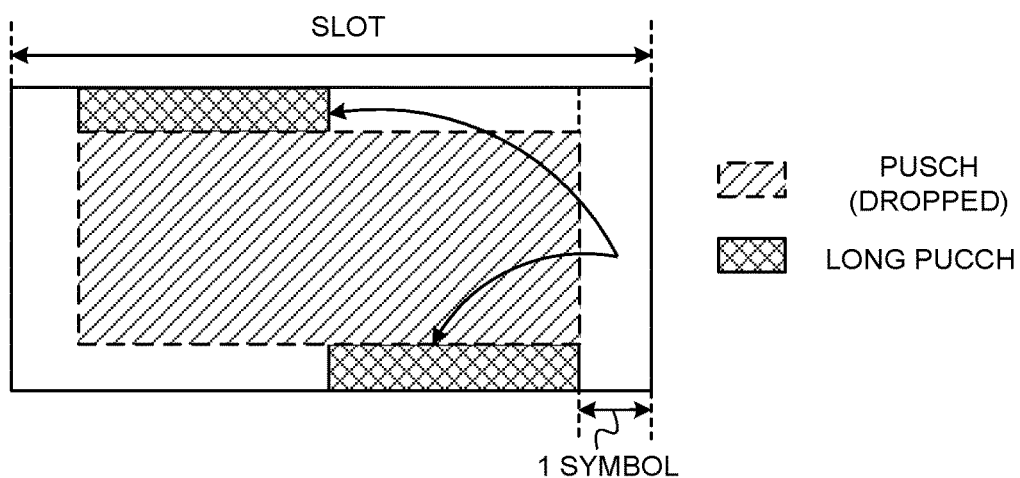
Figure 8C:
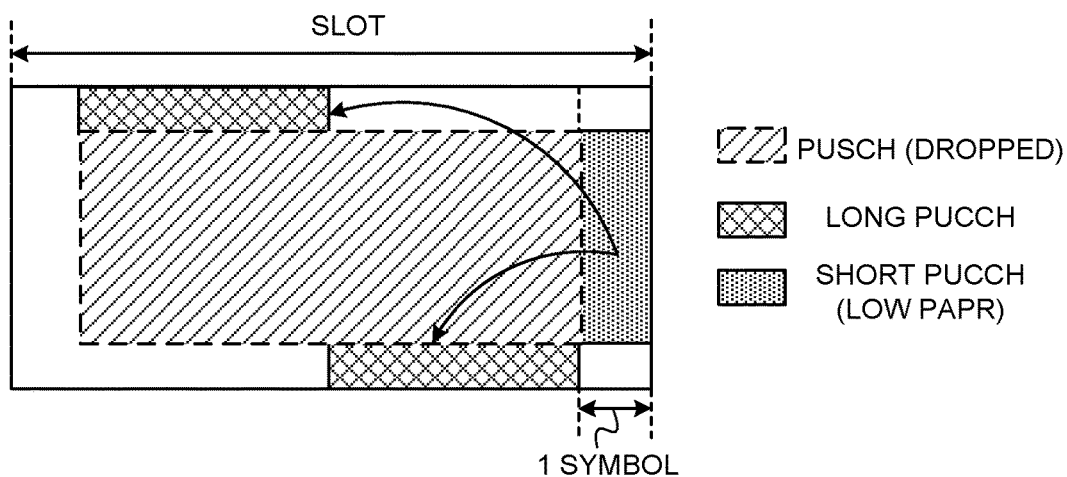

FIG. 8 provide diagrams to show examples of UCI transmission control according to the second example. For example, FIG. 8A shows a case where indication information that is provided through higher layer signaling and/or DCI fulfills above predetermined condition A. FIGS. 8B and 8C show a case where this indication information does not fulfill predetermined condition A, and a case where this indication information fulfills above predetermined condition B.

As shown in FIG. 8A, when above predetermined condition A is fulfilled in a slot in which a PUSCH is transmitted, the user terminal may transmit UCI by using a high-payload short PUCCH (also referred to as a "short PUCCH of a CP-OFDM waveform," "first UL control channel," etc.). The PUSCH and the high-payload short PUCCH may be time-division-multiplexed (TDM) and/or frequency-division-multiplexed (FDM) (TDM is used in FIG. 8A).

In the case shown in FIG. 8A, the waveforms of both the PUSCH and the short PUCCH transmitted in the same slot are CP-OFDM waveforms, so that it is possible to prevent coverage imbalance between the PUSCH and the short PUCCH, and, furthermore, increase the payload of the PUSCH and the short PUCCH.

Meanwhile, as shown in FIG. 8B, when above predetermined condition A is not fulfilled or above predetermined condition B is fulfilled in a slot in which a PUSCH is transmitted, the user terminal may drop the PUSCH and transmit UCI by using a long PUCCH. In the case shown in FIG. 8B, it is possible to avoid transmitting the PUSCH and the long PUCCH simultaneously, so that the processing in the user terminal can be simplified.

Alternatively, as shown in FIG. 8C, when above predetermined condition A is not fulfilled or above predetermined condition B is fulfilled in a slot in which a PUSCH is transmitted, the user terminal may drop the PUSCH and transmit at least part of the UCI (for example, HARQ-ACK and/or SR) by using a low-PAPR short PUCCH (also referred to as a "short PUCCH of a DFT-spreading OFDM waveform," "second UL control channel," etc.). Furthermore, the user terminal may transmit different UCI (for example, CSI) by using this long PUCCH.

In the case shown in FIG. 8C, it is possible to avoid transmitting the PUSCH and the long PUCCH simultaneously, so that the processing in the user terminal can be simplified. Also, UCI that cannot be transmitted using a low-PAPR short PUCCH can be transmitted by means of the long PUCCH, so that UCI, which is relatively important information, can be transmitted in a low-PAPR short PUCCH and a long PUCCH, and, furthermore, the payload of UCI that can be communicated within 1 slot can be increased more than shown in FIG. 7B.

As described above, according to the third example, when there is a PUSCH to transmit, the transmission of UCI is controlled based on indication information that is provided through higher layer signaling and/or DCI, so that so that it is possible to control the transmission of UCI appropriately using a PUCCH of a DFT-spreading OFDM waveform or a CP-OFDM waveform.

Fourth Example

According to a fourth example of the present invention, when there is a PUSCH to be transmitted, a user terminal controls the transmission of UCI based on indication information that is provided through higher layer signaling and/or DCI. Now, the fourth example will be described below, primarily focusing on differences from at least one of the first, second and third examples. Note that predetermined conditions A and B are the same as those described in the second example.

To be more specific, when there is a PUSCH to transmit and the above-noted indication information fulfills predetermined condition A, the user terminal transmits UCI by using a short PUCCH of an CP-OFDM waveform (multi-carrier waveform) (first UL control channel).

Meanwhile, when there is a PUSCH to transmit and the above indication information does not fulfill predetermined condition A or fulfills predetermined condition B, the user terminal transmits at least part of the UCI by using a short PUCCH of a DFT-spreading OFDM waveform (single-carrier waveform) (second UL control channel), or transmits the above UCI by using a low-PAPR short PUCCH (also referred to as a "short PUCCH of a DFT-spreading OFDM waveform," "fourth control channel," etc.), which is inserted by puncturing the PUSCH. Here, according to the fourth example, the PUSCH is punctured after IFFT (or IDFT) spreading is applied to the PUSCH.

Figure 9A:
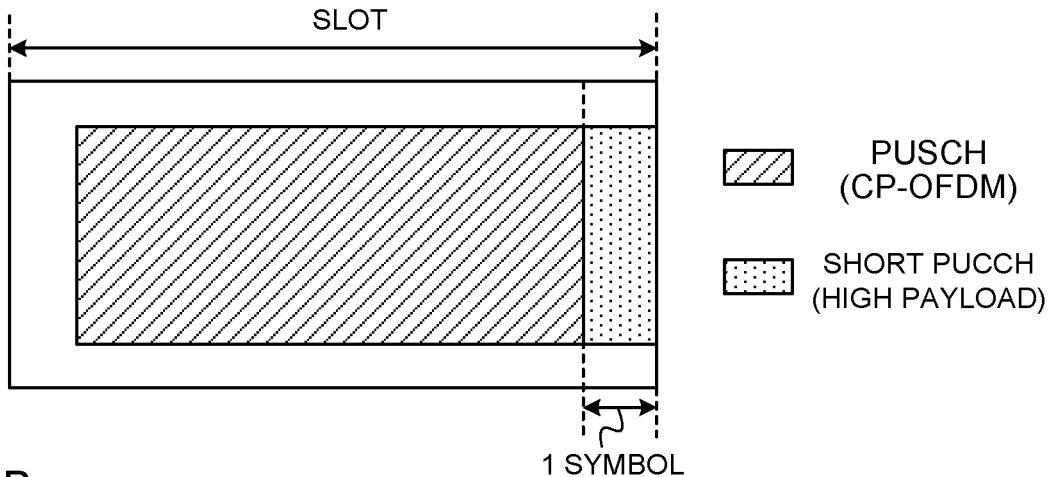
FIGS. 9A to 9C are diagrams to show examples of UCI transmission control according to a fourth example of the present invention.
Figure 9B:
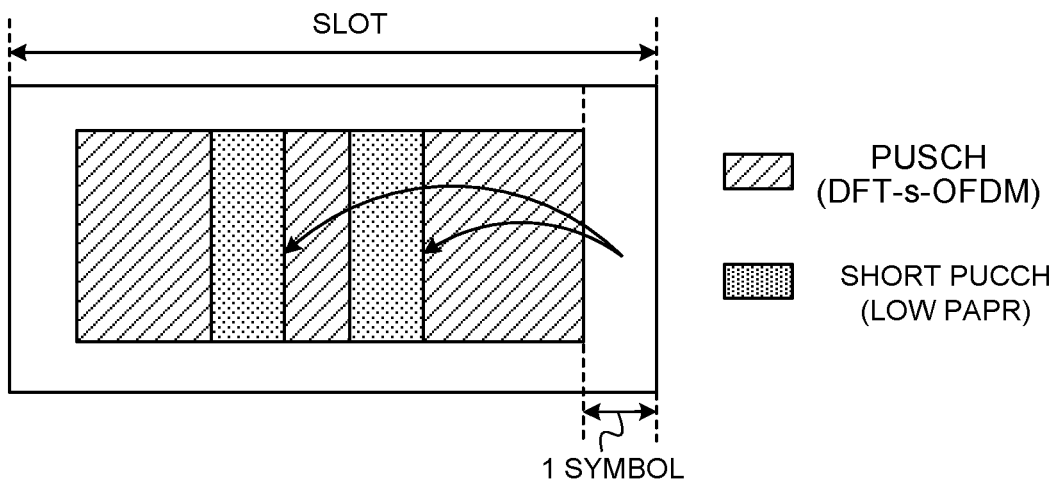
Figure 9C:
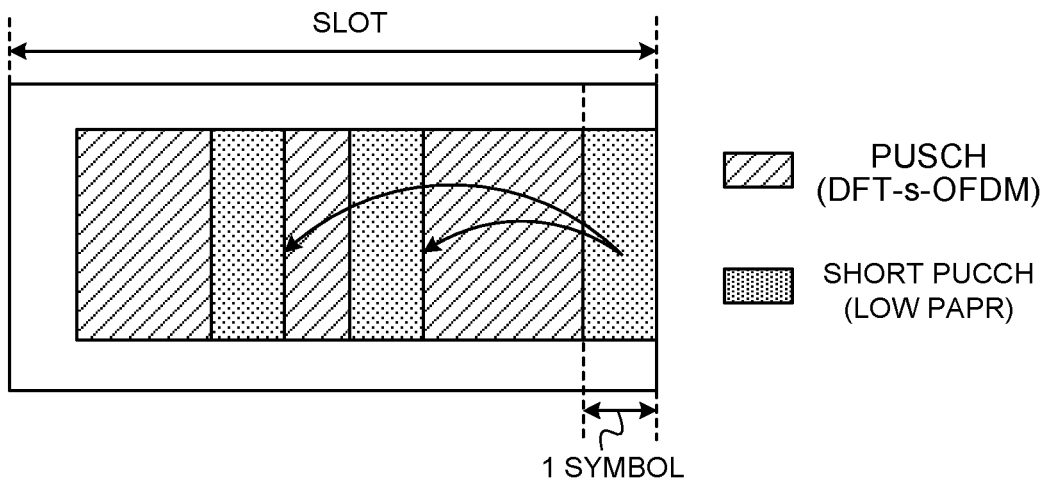

FIG. 9 provide diagrams to show examples of UCI transmission control according to the second example. For example, FIG. 9A shows a case where indication information that is provided through higher layer signaling and/or DCI fulfills above predetermined condition A. FIGS. 9B and 9C show a case where this indication information does not fulfill predetermined condition A, and a case where this indication information fulfills above predetermined condition B.

As shown in FIG. 9A, when above predetermined condition A is fulfilled in a slot in which a PUSCH is transmitted, the user terminal may transmit UCI by using a high-payload short PUCCH (also referred to as a "short PUCCH of a CP-OFDM waveform," "first UL control channel," etc.). The PUSCH and the high-payload short PUCCH may be time-division-multiplexed (TDM) and/or frequency-division-multiplexed (FDM) (TDM is used in FIG. 9A).

In the case shown in FIG. 9A, the waveforms of both the PUSCH and the short PUCCH transmitted in the same slot are CP-OFDM waveforms, so that it is possible to prevent coverage imbalance between the PUSCH and the short PUCCH, and, furthermore, increase the payload of the PUSCH and the short PUCCH.

Meanwhile, as shown in FIG. 9B, when predetermined condition A is not fulfilled or predetermined condition B is fulfilled in a slot in which a PUSCH is transmitted, the user terminal may puncture the PUSCH and transmit the UCI by using a low-PAPR short PUCCH (also referred to as a "short PUCCH of a DFT-spreading OFDM waveform," "fourth UL control channel," etc.).

Alternatively, as shown in FIG. 9C, when above predetermined condition A is not fulfilled or above predetermined condition B is fulfilled in a slot in which a PUSCH is transmitted, the user terminal may transmit at least part of the UCI (for example, HARQ-ACK and/or SR) by using a low-PAPR short PUCCH (also referred to as a "short PUCCH of a DFT-spreading OFDM waveform," "second UL control channel," etc.). In addition, the user terminal may puncture the PUSCH and transmit different UCI (for example, CSI) by using a low-PAPR short PUCCH (also referred to as a "short PUCCH of a DFT-spreading OFDM waveform," "fourth UL control channel," etc.).

In FIGS. 9B and 9C, the PUSCH is punctured and a low-PAPR short PUCCH is inserted there, so that it is possible to allocate frequency resources to this low-PAPR short PUCCH according to the payload of UCI, without being bound by the frequency resources allocated to the PUSCH.

As described above, according to the fourth example, when there is a PUSCH to be transmitted, the transmission of UCI is controlled based on indication information provided through higher layer signaling and/or DCI, so that so that it is possible to control the transmission of UCI appropriately using a PUCCH of a DFT-spreading OFDM waveform or a CP-OFDM waveform.

Other Examples

Figure 10:
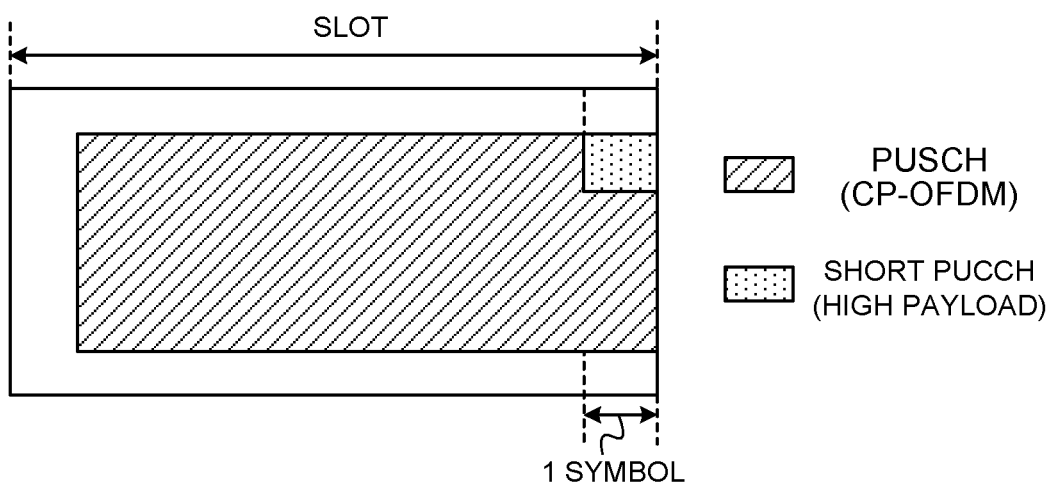
FIG. 10 is a diagram to show an example of UCI transmission control according to another example of the present invention.

FIG. 2A, FIG. 8A and FIG. 9A have shown cases where a PUSCH and a high-payload short PUCCH are time-division-multiplexed (TDM), but this is by no means limiting. As shown in FIG. 10, when the waveform of a PUSCH is a CP-OFDM waveform, the PUSCH may be partially frequency-division-multiplexed (FDM) with a high-payload short PUCCH (or these may be time-division-multiplexed (TDM) and frequency-division-multiplexed (FDM)). Note that, when the waveform of the PUSCH is a DFT-spreading OFDM waveform, the PUSCH may be time-division-multiplexed (TDM) with a low-PAPR short PUCCH.

Also, DFT-spreading OFDM waveforms according to the present embodiment may include a clustered DFT-spreading OFDM waveform.

(Radio Communication System)

Now, the structure of a radio communication system according to the present embodiment will be described below. In this radio communication system, each radio communication method according to the above-described embodiments is employed. Note that the radio communication methods according to the herein-contained examples of the present invention may be applied individually, or may be combined and applied.

Figure 11:
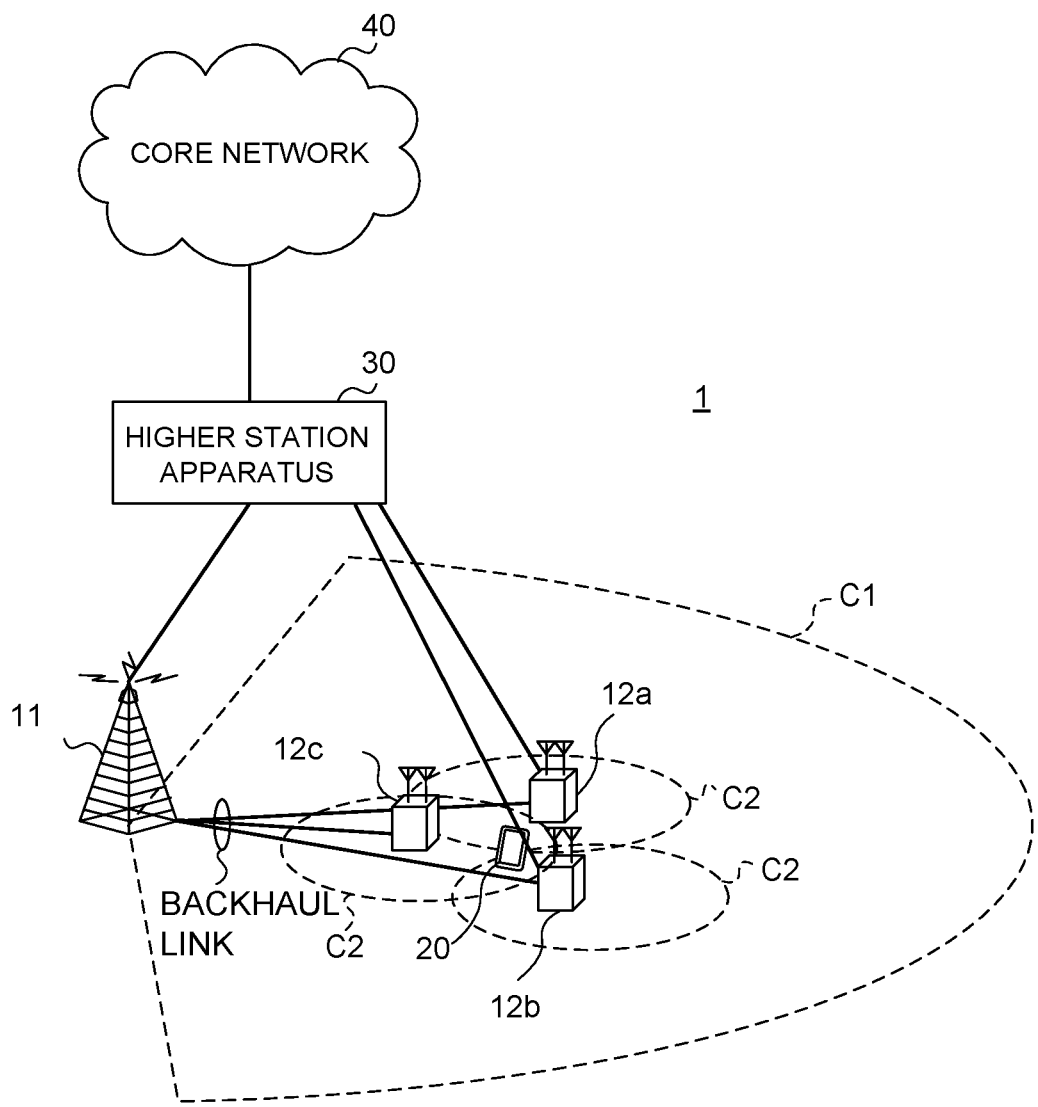
FIG. 11 is a diagram to show an exemplary schematic structure of a radio communication system according to the present embodiment.

FIG. 11 is a diagram to show an exemplary schematic structure of a radio communication system according to the present embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit. Note that the radio communication system 1 may be referred to as "SUPER 3G," "LTE-A (LTE-Advanced)," "IMT-Advanced," "4G," "5G," "FRA (Future Radio Access)," "NR (New RAT)" and so on.

The radio communication system 1 shown in FIG. 11 includes a radio base station 11 that forms a macro cell C1, and radio base stations 12a to 12c that are placed within the macro cell C1 and that form small cells C2, which are narrower than the macro cell C1. Also, user terminals 20 are placed in the macro cell C1 and in each small cell C2. A structure in which different numerologies are applied between cells may be adopted. Note that a "numerology" refers to a set of communication parameters that characterize the design of signals in a given RAT and/or the design of the RAT.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a plurality of cells (CCs) (for example, 2 or more CCs). Furthermore, the user terminals can use license band CCs and unlicensed band CCs as a plurality of cells.

Furthermore, the user terminal 20 can perform communication using time division duplexing (TDD) or frequency division duplexing (FDD) in each cell. A TDD cell and an FDD cell may be referred to as a "TDD carrier (frame configuration type 2)," and an "FDD carrier (frame configuration type 1)," respectively.

Also, in each cell (carrier), either subframes having a relatively long time duration (for example, 1 ms) (also referred to as "TTIs," "normal TTIs," "long TTIs," "normal subframes," "long subframes," "slots," and/or the like), or subframes having a relatively short time duration (also referred to as "short TTIs," "short subframes," "slots" and/or the like) may be applied, or both long subframes and short subframe may be used. Furthermore, in each cell, subframes of 2 or more time lengths may be used.

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, 30 to 70 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, optical fiber, which is in compliance with the Common Public Radio Interface (CPRI), the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmission/reception point" and so on. Also, the radio base stations 12 are radio base stations having local coverages, and may be referred to as "small base stations," "micro base stations," "pico base stations," "femto base stations," "Home eNodeBs (HeNBs)," "Remote Radio Heads (RRHs)," "transmission/reception points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals. Furthermore, the user terminals 20 can perform inter-terminal (D2D) communication with other user terminals 20.

In the radio communication system 1, as radio access schemes, OFDMA (orthogonal Frequency Division Multiple Access) can be applied to the downlink (DL), and SC-FDMA (Single-Carrier Frequency Division Multiple Access) can be applied to the uplink (UL). OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system band into bands formed with one or continuous resource blocks per terminal, and allowing a plurality of terminals to use mutually different bands. Note that the uplink and downlink radio access schemes are not limited to the combinations of these, and OFDMA may be used in UL. Also, SC-FDMA can be applied to a side link (SL) that is used in inter-terminal communication.

In the radio communication system 1, a DL data channel (Physical Downlink Shared CHannel (PDSCH), also referred to as a DL shared channel and/or the like), which is used by each user terminal 20 on a shared basis, a broadcast channel (Physical Broadcast CHannel (PBCH)), L1/L2 control channels and so on are used as DL channels. At least one of user data, higher layer control information and System Information Blocks (SIBs) is communicated in the PDSCH. Also, the Master Information Block (MIB) is communicated in the PBCH.

The L1/L2 control channels include DL control channels (Physical Downlink Control CHannel (PDCCH), Enhanced Physical Downlink Control CHannel (EPDCCH), etc.), a Physical Control Format Indicator CHannel (PCFICH), a Physical Hybrid-ARQ Indicator CHannel (PHICH) and so on. Downlink control information (DCI), including PDSCH and PUSCH scheduling information, is communicated by the PDCCH and/or the EPDCCH. The number of OFDM symbols to use for the PDCCH is communicated by the PCFICH. The EPDCCH is frequency-division-multiplexed with the PDSCH and used to communicate DCI and so on, like the PDCCH. PUSCH delivery acknowledgment information (A/N, HARQ-ACK, etc.) can be communicated in at least one of the PHICH, the PDCCH and the EPDCCH.

In the radio communication system 1, a UL data channel (Physical Uplink Shared CHannel (PUSCH), also referred to as a UL shared channel and/or the like), which is used by each user terminal 20 on a shared basis, an UL control channel (Physical Uplink Control CHannel (PUCCH)), a random access channel (Physical Random Access CHannel (PRACH)) and so on are used as UL channels. User data, higher layer control information and so on are communicated by the PUSCH. Uplink control information (UCI), including at least one of PDSCH delivery acknowledgement information (A/N, HARQ-ACK, etc.), channel state information (CSI) and so on, is communicated in the PUSCH or the PUCCH. By means of the PRACH, random access preambles for establishing connections with cells are communicated.

\<Radio Base Station\>

Figure 12:
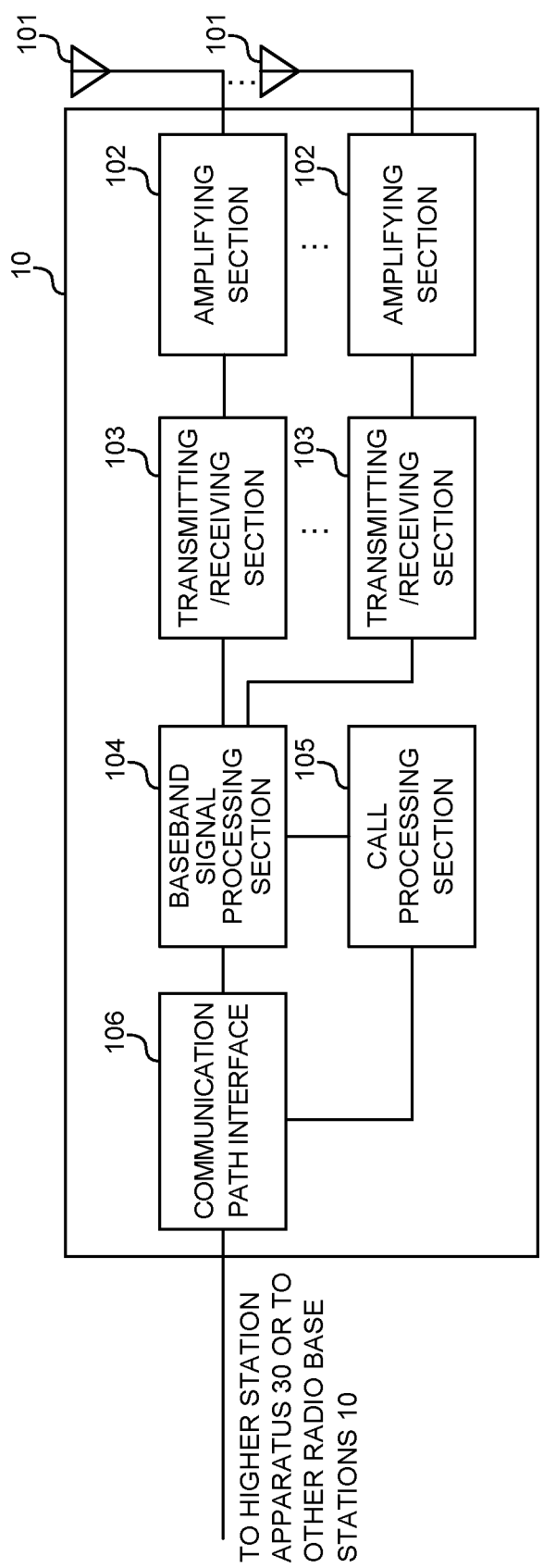
FIG. 12 is a diagram to show an exemplary overall structure of a radio base station according to the present embodiment.

FIG. 12 is a diagram to show an exemplary overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a Packet Data Convergence Protocol (PDCP) layer process, division and coupling of the user data, Radio Link Control (RLC) layer transmission processes such as RLC retransmission control, Medium Access Control (MAC) retransmission control (for example, an Hybrid Automatic Repeat reQuest (HARD) process), scheduling, transport format selection, channel coding, rate matching, scrambling, an inverse fast Fourier transform (IFFT) process and a precoding process, and the result is forwarded to each transmitting/receiving sections 103. Furthermore, downlink control signals are also subjected to transmission processes such as channel coding and an inverse fast Fourier transform, and forwarded to the transmitting/receiving sections 103.

Baseband signals that are pre-coded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101.

The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are each amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, UL data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 at least performs call processing such as setting up and releasing communication channels, manages the state of the radio base station 10 or manages the radio resources.

The communication path interface section 106 transmits and receives signals to and from the higher station apparatus 30 via a predetermined interface. Also, the communication path interface 106 may transmit and/or receive signals (backhaul signaling) with neighboring radio base stations 10 via an inter-base station interface (for example, an interface in compliance with the Common Public Radio Interface (CPRI), such as optical fiber, the X2 interface, etc.).

In addition, the transmitting/receiving sections 103 transmit DL signals (for example, at least one of DCI (DL assignment for scheduling DL data and/or UL grant for scheduling UL data), DL data, and DL reference signals) and receive UL signals (for example, at least one of UL data, UCI, and UL reference signals).

In addition, the transmitting/receiving sections 103 receive UCI from the user terminal 20 by using a UL data channel (for example, a PUSCH) or a UL control channel (for example, at least one of a short PUCCH of high payload, a short PUCCH of low PAPR, and a long PUCCH). This UCI may contain at least one of an HARQ-ACK, CSI, an SR, a beam index (BI) and a buffer status report (BSR) pertaining to a DL data channel (for example, PDSCH).

Also, the transmitting/receiving sections 103 may transmit information that indicates the waveform of the UL data channel (for example, PUSCH) (PUSCH waveform information) (first example). This PUSCH waveform information may be transmitted by higher layer signaling or may be included in DCI. The PUSCH waveform information included in the DCI may indicate the PUSCH waveform explicitly or implicitly.

In addition, the transmitting/receiving sections 103 transmit information about the UL control channel (for example, PUSCH) (PUCCH information) which the user terminal 20 uses to transmit UCI. This PUCCH information may be used as indication information to indicate the format of the PUCCH that is used to transmit UCI (for example, at least one of a high-payload short PUCCH (first UL control channel), a low-PAPR short PUCCH (second UL control channel), a long PUCCH (third UL control channel) and a low-PAPR short PUCCH that is inserted by puncturing a PUSCH (fourth UL control channel)) (second to fourth examples).

This PUCCH information may be transmitted by higher layer signaling or may be included in DCI. The indication information included in DCI may indicate the format of the PUCCH used to transmit UCI, explicitly or implicitly.

Figure 13:
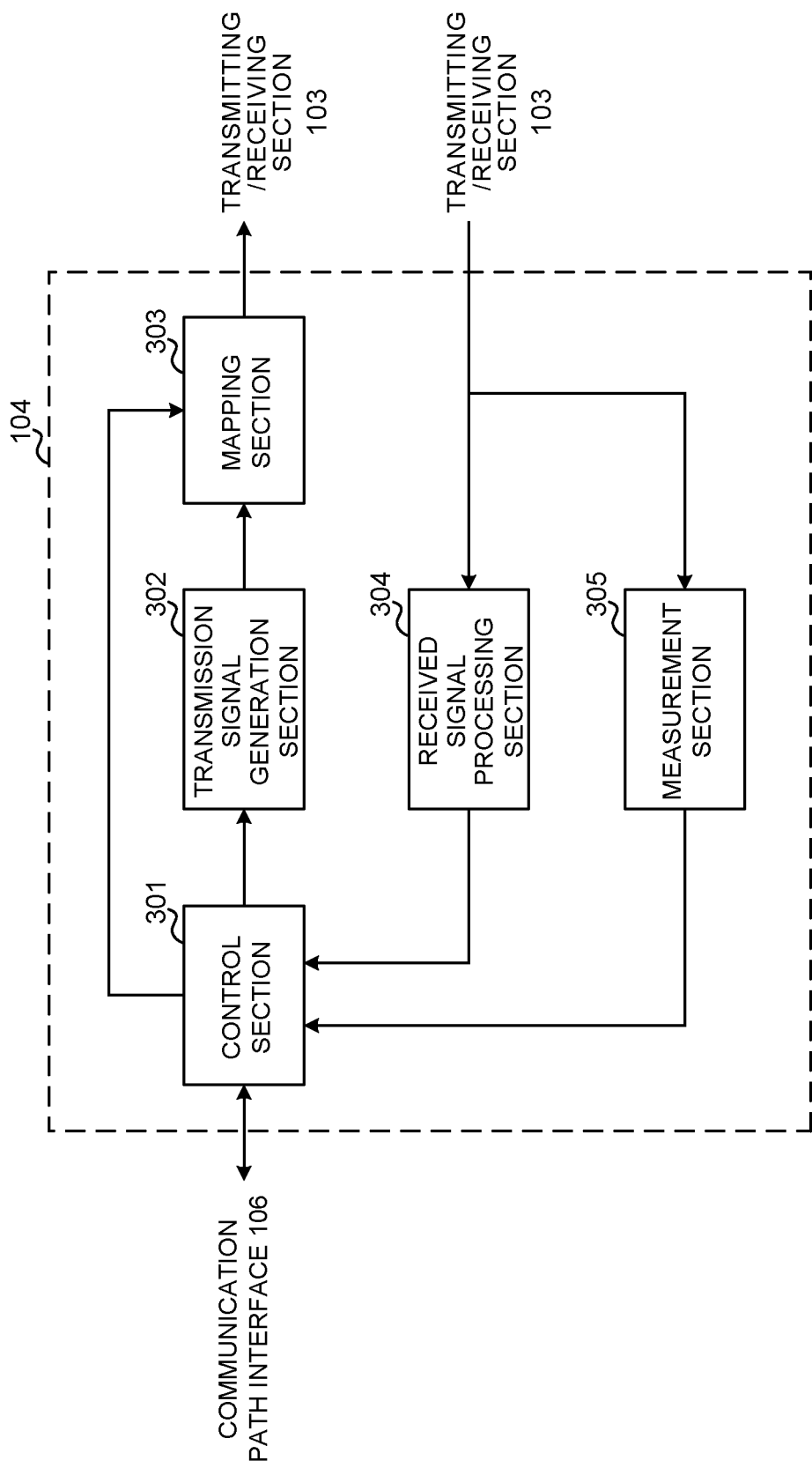
FIG. 13 is a diagram to show an exemplary functional structure of a radio base station according to the present embodiment.

FIG. 13 is a diagram to show an exemplary functional structure of a radio base station according to the present embodiment. Note that, although FIG. 13 primarily shows functional blocks that pertain to characteristic parts of the present embodiment, the radio base station 10 has other functional blocks that are necessary for radio communication as well. As shown in FIG. 13, the baseband signal processing section 104 has a control section 301, a transmission signal generation section 302, a mapping section 303, a received signal processing section 304 and a measurement section 305.

The control section 301 controls the whole of the radio base station 10. The control section 301 controls, for example, at least one of generation of downlink signals in the transmission signal generation section 302, mapping of downlink signals in the mapping section 303, the receiving process (for example, demodulation) of uplink signals in the received signal processing section 304, and measurements in the measurement section 305.

The control section 301 schedules user terminals 20. To be more specific, the control section 301 may control the scheduling and/or retransmission of DL data and/or UL data channels based on UCI (for example, CSI) from the user terminal 20.

In addition, the control section 301 may control the generation and/or transmission of the above-mentioned PUSCH waveform information. In addition, the control section 301 may control the generation and/or transmission of the above PUCCH information.

The control section 301 may control the received signal processing section 304 to perform receiving processes for the UCI from the user terminal 20 based on the PUCCH format determined based on the PUSCH waveform and/or the format indicated by the PUCCH information.

The control section 301 can be constituted by a controller, a control circuit or control apparatus that can be described based on general understanding of the technical field to which the present invention pertains.

The transmission signal generation section 302 generates DL signals (including DL data signals, DL control signals, DL reference signals and so on) based on indications from the control section 301, and outputs these signals to the mapping section 303.

The transmission signal generation section 302 can be constituted by a signal generator, a signal generation circuit or signal generation apparatus that can be described based on general understanding of the technical field to which the present invention pertains.

The mapping section 303 maps the DL signals generated in the transmission signal generation section 302 to predetermined radio resources based on indications from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding, etc.) of UL signals transmitted from the user terminals 20 (including, for example, a UL data signal, a UL control signal, a UL reference signal, etc.). To be more specific, the received signal processing section 304 may output the received signals, the signals after the receiving processes and so on, to the measurement section 305. In addition, the received signal processing section 304 performs UCI receiving processes based on UL control channel configuration indicated from the control section 301.

The measurement section 305 conducts measurements with respect to the received signals. The measurement section 305 can be constituted by a measurer, a measurement circuit or measurement apparatus that can be described based on general understanding of the technical field to which the present invention pertains.

Also, the measurement section 305 may measure the channel quality in UL based on, for example, the received power (for example, Reference Signal Received Power (RSRP)) and/or the received quality (for example, Reference Signal Received Quality (RSRQ)) of UL reference signals. The measurement results may be output to the control section 301.

(User Terminal)

Figure 14:
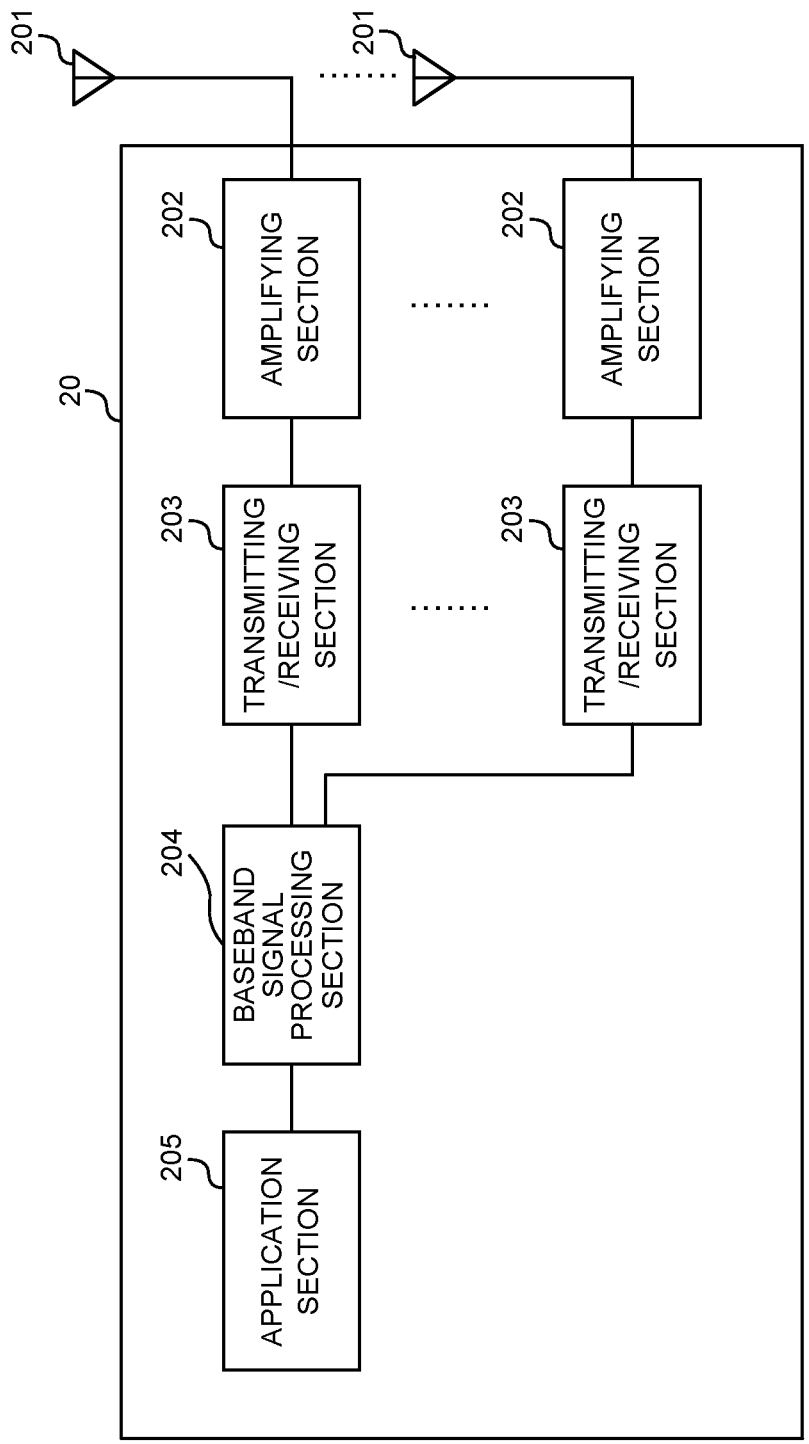
FIG. 14 is a diagram to show an exemplary overall structure of a user terminal according to the present embodiment.

FIG. 14 is a diagram to show an exemplary overall structure of a user terminal according to the present embodiment. A user terminal 20 has a plurality of transmitting/receiving antennas 201 for MIMO communication, amplifying sections 202, transmitting/receiving sections 203, a baseband signal processing section 204 and an application section 205.

Radio frequency signals that are received in a plurality of transmitting/receiving antennas 201 are each amplified in the amplifying sections 202. Each transmitting/receiving section 203 receives the DL signals amplified in the amplifying sections 202. The received signals are subjected to frequency conversion and converted into the baseband signal in the transmitting/receiving sections 203, and output to the baseband signal processing section 204.

The baseband signal processing section 204 performs, for the baseband signal that is input, at least one of an FFT process, error correction decoding, a retransmission control receiving process and so on. The DL data is forwarded to the application section 205. The application section 205 performs processes related to higher layers above the physical layer and the MAC layer, and so on.

Meanwhile, UL data is input from the application section 205 to the baseband signal processing section 204. The baseband signal processing section 204 performs a retransmission control transmission process (for example, an HARQ transmission process), channel coding, rate matching, puncturing, a discrete Fourier transform (DFT) process, an IFFT process and so on, and the result is forwarded to each transmitting/receiving section 203. UCI (including, for example, at least one of an A/N in response to a DL signal, channel state information (CSI) and a scheduling request (SR), and/or others) is also subjected to at least one of channel coding, rate matching, puncturing, a DFT process, an IFFT process and so on, and the result is forwarded to the transmitting/receiving sections 203.

Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

In addition, the transmitting/receiving section sections 203 receive DL signals (for example, at least one of DCI (DL assignment and/or UL grant), DL data and DL reference signals) and transmit UL signals (for example, at least one of UL data, UCI, and UL reference signals).

In addition, the transmitting/receiving sections 203 transmit UCI by using a UL data channel (for example, PUSCH) or a UL control channel (for example, at least one of a short PUCCH of high payload, a short PUCCH of low PAPR, and a long PUCCH).

In addition, the transmitting/receiving sections 203 may receive PUSCH waveform information (first example), which has been mentioned earlier. Also, the transmitting/receiving sections 203 may receive the PUCCH information (second to fourth examples), which also has been mentioned earlier.

The transmitting/receiving sections 203 can be constituted by transmitters/receivers, transmitting/receiving circuits or transmitting/receiving apparatus that can be described based on general understanding of the technical field to which the present invention pertains. Furthermore, a transmitting/receiving section 203 may be structured as one transmitting/receiving section, or may be formed with a transmitting section and a receiving section.

Figure 15:
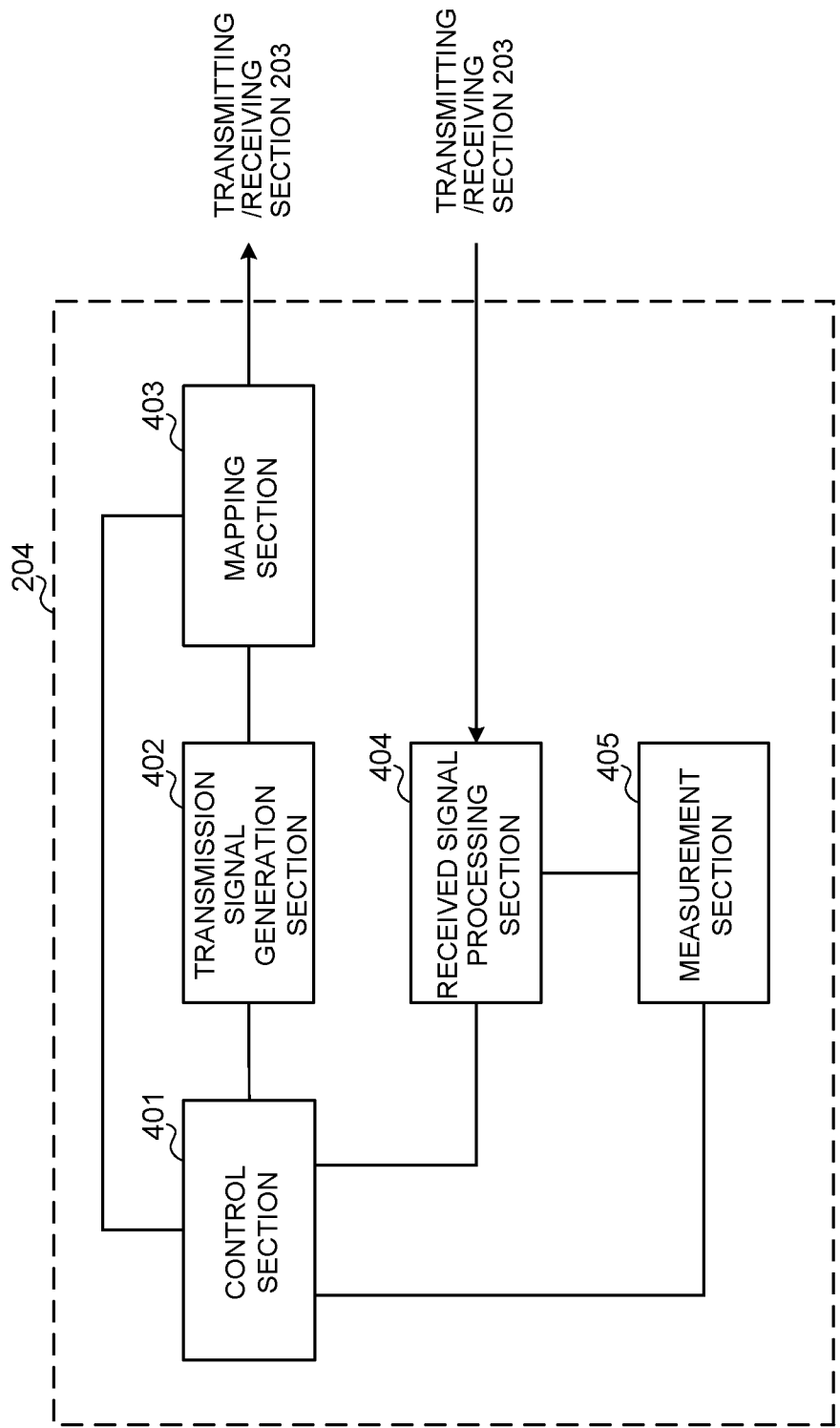
FIG. 15 is a diagram to show an exemplary functional structure of a user terminal according to the present embodiment.

FIG. 15 is a diagram to show an exemplary functional structure of a user terminal according to the present embodiment. Note that, although FIG. 15 primarily shows functional blocks that pertain to characteristic parts of the present embodiment, the user terminal 20 has other functional blocks that are necessary for radio communication as well. As shown in FIG. 15, the baseband signal processing section 204 provided in the user terminal 20 has a control section 401, a transmission signal generation section 402, a mapping section 403, a received signal processing section 404 and a measurement section 405.

The control section 401 controls the whole of the user terminal 20. The control section 401 controls, for example, at least one of generation of UL signals in the transmission signal generation section 402, mapping of UL signals in the mapping section 403, the receiving process of DL signals in the received signal processing section 404 and measurements in the measurement section 405.

In addition, the control section 401 controls the UL control channel which the user terminal 20 uses to transmit UCI, based on explicit indications from the radio base station 10 or implicit indications by the user terminal 20.

Furthermore, the control section 401 controls the transmission of the UCI based on the waveform of the PUSCH (first example). To be more specific, when the PUSCH waveform is a CP-OFDM waveform (multi-carrier waveform), the control section 401 may control the transmission of UCI using a short PUCCH of high-payload (first UL control channel).

On the other hand, when the PUSCH waveform is a DFT-spreading OFDM waveform (single-carrier waveform), the control section 401 may control the transmission of UCI by using the PUSCH. Alternatively, when the PUSCH waveform is a DFT-spreading OFDM waveform (single-carrier waveform), the control section 401 may control the transmission of at least part of the UCI (for example, HARQ-ACK/SR) by using a short PUCCH of low-PAPR (second UL control channel), and/or control the transmission of the rest of the UCI (for example, CSI) using the PUSCH.

Also, the control section 401 may control the transmission of UCI based on indication information provided via higher layer signaling and/or DCI (second to fourth examples). To be more specific, the control section 401 may control the transmission of UCI by using a short PUCCH of high payload (first UL control channel) when the above indication information fulfills predetermined condition A (second and third examples). On the other hand, when the above indication information does not fulfill predetermined condition A or when the above indication information fulfills predetermined condition B, the control section 401 may control the transmission of UCI by using a long PUCCH (third control channel) (second and third examples).

Also, assuming that a PUSCH is scheduled (transmitted) in a slot where UCI is transmitted, if the above indication information does not fulfill predetermined condition A or the above indication information fulfills predetermined condition B, the control section 401 drops the PUSCH and controls the transmission of UCI by using a long PUCCH (third control channel) (third example).

Also, when there is a PUSCH to transmit and the above indication information fulfills predetermined condition A, the control section 401 may control the transmission of UCI using a short PUCCH of high payload (first UL control channel) (fourth example). Furthermore, when the above indication information does not fulfill predetermined condition A or the above indication information fulfills predetermined condition B, the control section 401 may control the transmission of UCI by using a short PUCCH of low PARP that is inserted by puncturing the PUSCH (fourth control channel).

The control section 401 can be constituted by a controller, a control circuit or control apparatus that can be described based on general understanding of the technical field to which the present invention pertains.

In the transmission signal generation section 402, UL signals (including UL data signals, UL control signals, UL reference signals, UCI, etc.) are generated (including, for example, encoding, rate matching, puncturing, modulation, etc.) based on indications from the control section 401, and output to the mapping section 403. The transmission signal generation section 402 can be constituted by a signal generator, a signal generation circuit or signal generation apparatus that can be described based on general understanding of the technical field to which the present invention pertains.

The mapping section 403 maps the UL signals generated in the transmission signal generation section 402 to radio resources based on indications from the control section 401, and output the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding, etc.) of DL signals (including DL data signals, scheduling information, DL control signals, DL reference signals, etc.). The received signal processing section 404 outputs the information received from the radio base station 10, to the control section 401. The received signal processing section 404 outputs, for example, broadcast information, system information, high layer control information related to higher layer signaling such as RRC signaling, physical layer control information (L1/L2 control information) and so on, to the control section 401.

The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The measurement section 405 measures channel states based on reference signals (for example, CSI-RS) from the radio base station 10, and outputs the measurement results to the control section 401. Note that the channel state measurements may be conducted per CC.

The measurement section 405 can be constituted by a signal processor, a signal processing circuit or signal processing apparatus, and a measurer, a measurement circuit or measurement apparatus that can be described based on general understanding of the technical field to which the present invention pertains.

(Hardware Structure)

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 16:
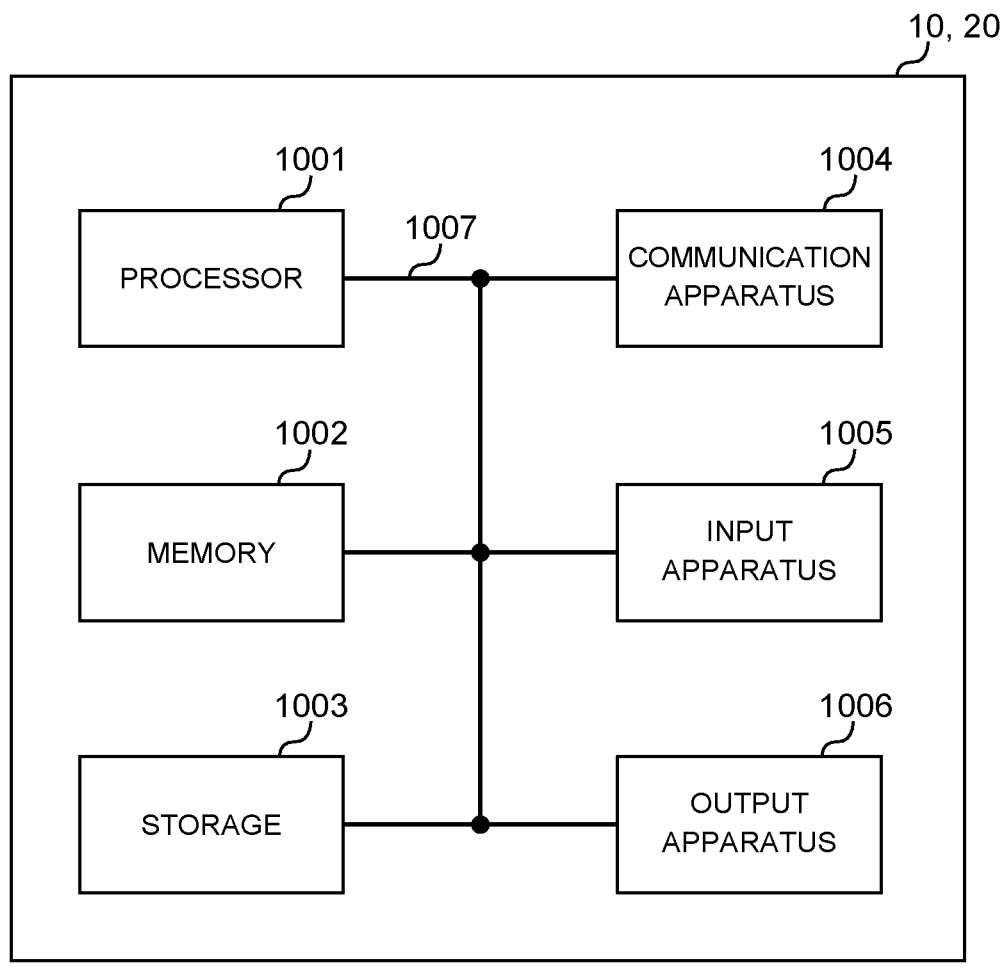
FIG. 16 is a diagram to show an exemplary hardware structure of a radio base station and a user terminal according to the present embodiment.

For example, the radio base station, user terminals and so on according to embodiments of the present invention may function as a computer that executes the processes of the radio communication method of the present invention. FIG. 16 is a diagram to show an exemplary hardware structure of a radio base station and a user terminal according to present embodiment. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on one or more processors. Note that the processor 1001 may be implemented with one or more chips.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a Read Only Memory (ROM), an Erasable Programmable ROM (EPROM), an Electrically EPROM (EEPROM), a Random Access Memory (RAM) and/or other appropriate storage media. The memory 1002 may be referred to as a "register," a "cache," a "main memory (primary storage apparatus)" and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an Light Emitting Diode (LED) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an Application-Specific Integrated Circuit (ASIC), a Programmable Logic Device (PLD), an Field Programmable Gate Array (FPGA) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or multiple slots in the time domain. A subframe may be a fixed time duration (for example, 1 ms) not dependent on the numerology.

Furthermore, a slot may be comprised of one or more symbols in the time domain (Orthogonal Frequency Division Multiplexing (OFDM) symbols, Single-carrier Frequency Division Multiple Access (SC-FDMA) symbols, and so on). Also, a slot may be a time unit based on numerology. Also, a slot may include a plurality of minislots. Each minislot may be comprised of one or more symbols in the time domain. Also, a minislot may be referred to as a "subslot."

A radio frame, a subframe, a slot, a minislot and a symbol all represent the time unit in signal communication. A radio frame, a subframe, a slot, a minislot and a symbol may be each called by other applicable names. For example, one subframe may be referred to as a "transmission time interval (TTI)," or a plurality of consecutive subframes may be referred to as a "TTI," or 1 slot or mini-slot may be referred to as a "TTI." That is, a subframe and/or a TTI may be a subframe (1 ms) in existing LTE, may be a shorter period than 1 ms (for example, one to thirteen symbols), or may be a longer period of time than 1 ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that, when a TTI is given, the period of time (for example, the number of symbols) in which transport blocks, code blocks and/or codewords are actually mapped may be shorter than the TTI.

Note that, when 1 slot or one minislot is referred to as a "TTI," one or more TTIs (that is, one or multiple slots or one or more minislots) may be the minimum time unit of scheduling. Also, the number of slots (the number of minislots) to constitute this minimum time unit of scheduling may be controlled.

A TTI having a time duration of 1 ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI," "a partial TTI (or a "fractional TTI"), a "shortened subframe," a "short subframe," a "mini-slot," "a sub-slot" and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI duration less than the TTI duration of a long TTI and not less than 1 ms.

A resource block (RB) is the unit of resource allocation in the time domain and the frequency domain, and may include one or a plurality of consecutive subcarriers in the frequency domain. Also, an RB may include one or more symbols in the time domain, and may be 1 slot, one minislot, one subframe or one TTI in length. One TTI and one subframe each may be comprised of one or more resource blocks. Note that one or more RBs may be referred to as a "physical resource block (Physical RB (PRB))," a "subcarrier group (SCG)," a "resource element group (REG)," a "PRB pair," an "RB pair" and so on.

Furthermore, a resource block may be comprised of one or more resource elements (REs). For example, one RE may be a radio resource field of one subcarrier and 1 symbol.

Note that the structures of radio frames, subframes, slots, minislots, symbols and so on described above are merely examples. For example, configurations pertaining to the number of subframes included in a radio frame, the number of slots included in a subframe, the number of mini-slots included in a slot, the number of symbols and RBs included in a slot or a mini-slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to predetermined values, or may be represented using other applicable information. For example, a radio resource may be specified by a predetermined index.

The names used for parameters and so on in this specification are in no respect limiting. For example, since various channels (Physical Uplink Control CHannel (PUCCH), Physical Downlink Control CHannel (PDCCH) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, in a memory), or may be managed in a control table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI)), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (for example, by not reporting this piece of information, by reporting another piece of information, and so on).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may also be referred to as, for example, a "subscriber station," a "mobile unit," a "subscriber unit," a "wireless unit," a "remote unit," a "mobile device," a "wireless device," a "wireless communication device," a "remote device," a "mobile subscriber station," an "access terminal," a "mobile terminal," a "wireless terminal," a "remote terminal," a "handset," a "user agent," a "mobile client," a "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (Device-to-Device (D2D)). In this case, user terminals 20 may have the functions of the radio base stations 10 described above. In addition, terms such as "uplink" and "downlink" may be interpreted as "side. For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by their upper nodes. In a network comprised of one or more network nodes with base stations, it is clear that various operations that are performed so as to communicate with terminals can be performed by base stations, one or more network nodes (for example, Mobility Management Entities (MMEs), Serving-Gateways (S-GWs) and so on may be possible, but these are not limiting) other than base stations, or combinations of these.

The examples/embodiments illustrated in this specification may be used individually or in combinations, which may be switched depending on the mode of implementation. The order of processes, sequences, flowcharts and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

The examples/embodiments illustrated in this specification may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-RAT (Radio Access Technology), New Radio (NR), New radio access (NX), Future generation radio access (FX), GSM (registered trademark) (Global System for Mobile communications), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication systems and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used herein only for convenience, as a method for distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. For example, "connection" may be interpreted as "access."

As used herein, when two elements are connected, these elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical (both visible and invisible) regions.

In the present specification, the phrase "A and B are different" may mean "A and B are different from each other." The terms such as "leave" "coupled" and the like may be interpreted as well.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
a receiver that receives a downlink control information (DCI) and higher layer signaling; and
a processor that determines, based on an indication information included in the DCI and a configuration information included in the higher layer signaling, a waveform, among waveforms including a Cyclic Prefix-Orthogonal Frequency Division Multiplexing (CP-OFDM) waveform and a Discrete Fourier Transform-Spread-Orthogonal Frequency Division Multiplexing (DFT-s-OFDM) waveform, of an uplink (UL) control channel (PUCCH) used in a transmission of an UL control information (UCI),
wherein the processor determines, based on the indication information included in the DCI and the configuration information included in the higher layer signaling, whether a number of symbols of the PUCCH is 1 or 2, or greater than 2, and
wherein, when there is no transmission of an UL shared channel (PUSCH) in a slot where the UCI is transmitted, the processor controls to transmit the UCI by using the PUCCH with the determined number of symbols and the determined waveform, based on the indication information included in the DCI.

2. A radio communication method for a terminal, comprising:
receiving a downlink control information (DCI) and higher layer signaling;
determining, based on an indication information included in the DCI and a configuration information included in the higher layer signaling, a waveform, among waveforms including a Cyclic Prefix-Orthogonal Frequency Division Multiplexing (CP-OFDM) waveform and a Discrete Fourier Transform-Spread-Orthogonal Frequency Division Multiplexing (DFT-s-OFDM) waveform, of an uplink (UL) control channel (PUCCH) used in a transmission of an UL control information (UCI);
determining, based on the indication information included in the DCI and the configuration information included in the higher layer signaling, whether a number of symbols of the PUCCH is 1 or 2, or greater than 2; and
when there is no transmission of an UL shared channel (PUSCH) in a slot where the UCI is transmitted, controlling to transmit the UCI by using the PUCCH with the determined number of symbols and the determined waveform, based on the indication information included in the DCI.

3. A base station comprising:
a transmitter that transmits a downlink control information (DCI), including an indication information, and higher layer signaling, including a configuration information, for a terminal to determine a waveform, among waveforms including a Cyclic Prefix-Orthogonal Frequency Division Multiplexing (CP-OFDM) waveform and a Discrete Fourier Transform-Spread-Orthogonal Frequency Division Multiplexing (DFT-s-OFDM) waveform, of an uplink (UL) control channel (PUCCH) and to determine whether a number of symbols of the PUCCH is 1 or 2, or greater than 2; and
a processor that indicates to transmit a UL control information (UCI) by using the PUCCH based on the indication information and the configuration information,
wherein, when there is no transmission of an UL shared channel (PUSCH) in a slot where the UCI is transmitted, the processor indicates to transmit the UCI by using the PUCCH with the determined number of symbols and the determined waveform, based on the indication information included in the DCI.

4. A system comprises a terminal and a base station, wherein:
the terminal comprising:
a receiver of the terminal that receives a downlink control information (DCI) and higher layer signaling; and
a processor of the terminal that determines, based on an indication information included in the DCI and a configuration information included in the higher layer signaling, a waveform, among waveforms including a Cyclic Prefix-Orthogonal Frequency Division Multiplexing (CP-OFDM) waveform and a Discrete Fourier Transform-Spread-Orthogonal Frequency Division Multiplexing (DFT-s-OFDM) waveform, of an uplink (UL) control channel (PUCCH) used in a transmission of an UL control information (UCI),
wherein the processor of the terminal determines, based on the indication information included in the DCI and the configuration information included in the higher layer signaling, whether a number of symbols of the PUCCH is 1 or 2, or greater than 2, and wherein, when there is no transmission of an UL shared channel (PUSCH) in a slot where the UCI is transmitted, the processor of the terminal controls to transmit the UCI by using the PUCCH with the determined number of symbols and the determined waveform, based on the indication information included in the DCI; and the base station comprising:

a transmitter of the base station that transmits the DCI and the higher layer signaling; and a processor of the base station that indicates to transmit the UCI by using the PUCCH based on the indication information and the configuration information, wherein, when there is no transmission of the PUSCH in the slot, the processor of the base station indicates to transmit the UCI by using the PUCCH with the determined number of symbols and the determined waveform, based on the indication information included in the DCI.

5. The terminal according to claim 1, wherein, when there is no transmission of the PUSCH in the slot, the processor controls to transmit the UCI by using a PUCCH of 1 or 2 symbols to which the CP-OFDM waveform is applied based on the indication information included in the DCI.

* * * * *